US008370920B2

(12) United States Patent
Garrard et al.

(10) Patent No.: US 8,370,920 B2
(45) Date of Patent: Feb. 5, 2013

(54) SYSTEM AND METHOD FOR PROVIDING UNIFIED TRANSPORT AND SECURITY PROTOCOLS

(75) Inventors: Kenneth W. Garrard, Atlanta, GA (US); Karl E. Elliott, Copeville, TX (US); Andy Huang, Richmond (CA)

(73) Assignee: Aunigma Network Security Corp., Atlanta, GA (US)

( * ) Notice: Subject to any disclaimer, the term of this patent is extended or adjusted under 35 U.S.C. 154(b) by 542 days.

(21) Appl. No.: 12/607,707

(22) Filed: Oct. 28, 2009

(65) Prior Publication Data

US 2011/0099623 A1    Apr. 28, 2011

(51) Int. Cl.
*G06F 17/00* (2006.01)
(52) U.S. Cl. ............... 726/14; 726/22; 726/24; 726/4; 726/11; 726/13
(58) Field of Classification Search ............. 726/22, 726/23, 4, 11, 13, 14
See application file for complete search history.

(56) References Cited

U.S. PATENT DOCUMENTS

| | | | | |
|---|---|---|---|---|
| 5,091,942 | A | 2/1992 | Dent | 380/46 |
| 5,237,612 | A | 8/1993 | Raith | 380/247 |
| 5,841,871 | A | 11/1998 | Pinkas | 713/155 |
| 6,002,769 | A | 12/1999 | McGough | 380/28 |
| 6,058,189 | A | 5/2000 | McGough | 380/28 |
| 6,266,413 | B1 | 7/2001 | Shefi | 380/46 |
| 6,445,797 | B1 | 9/2002 | McGough | 380/285 |
| 6,487,660 | B1 | 11/2002 | Vanstone et al. | 713/168 |
| 6,891,952 | B1 | 5/2005 | Puehlhoefer et al. | 380/262 |
| 7,139,679 | B1 | 11/2006 | McGrew | 702/186 |
| 7,290,281 | B1 | 10/2007 | McGrew | 726/23 |
| 7,774,841 | B2 | 8/2010 | Wu et al. | 726/22 |
| 7,937,759 | B2 | 5/2011 | Wu et al. | 726/22 |
| 8,127,355 | B2 | 2/2012 | Wu et al. | 726/22 |
| 2003/0149876 | A1 | 8/2003 | McGough | 713/171 |
| 2003/0177391 | A1 | 9/2003 | Ofek et al. | 713/201 |

(Continued)

FOREIGN PATENT DOCUMENTS

WO    WO 2011/053425    5/2011

OTHER PUBLICATIONS

Dwork et al., "Pricing via Processing or Combatting Junk Mail", in E. Brickell, editor, *Proceedings of Advances in Cryptology—Proc. CRYPTO '92*, vol. 1323 of LNCS, Santa Barbara, CA USA, Aug. 1992, pp. 139-147.

(Continued)

*Primary Examiner* — Brandon Hoffman
*Assistant Examiner* — Samuel Ambaye
(74) *Attorney, Agent, or Firm* — Pillsbury Winthrop Shaw Pittman LLP

(57) ABSTRACT

The system and method described herein may provide unified transport and security protocols. In particular, the unified transport and security protocols may include a Secure Frame Layer transport and security protocol that includes stages for initially configuring a requester device and a responder device, identifying the requester device and the responder device to one another, and authenticating message frames communicated between the requester device and the responder device. Additionally, the unified transport and security protocols may further include a Secure Persistent User Datagram Protocol that includes modes for processing message frames received at the requester device and the responder device, recovering the requester device in response to packet loss, retransmitting lost packets sent between the requester device and the responder device, and updating location information for the requester device to restore a communications session between the requester device and the responder device.

28 Claims, 8 Drawing Sheets

U.S. PATENT DOCUMENTS

| | | | |
|---|---|---|---|
| 2004/0250061 A1* | 12/2004 | Yamauchi et al. | 713/155 |
| 2005/0144352 A1 | 6/2005 | Wu et al. | 711/100 |
| 2005/0198489 A1 | 9/2005 | Wallace et al. | 713/151 |
| 2006/0034456 A1 | 2/2006 | McGough | 380/30 |
| 2006/0143453 A1* | 6/2006 | Imamoto et al. | 713/169 |
| 2007/0266241 A1 | 11/2007 | Wu et al. | 713/160 |
| 2008/0016354 A1 | 1/2008 | Wilding et al. | 713/171 |
| 2008/0046727 A1* | 2/2008 | Kanekar et al. | 713/168 |
| 2008/0184031 A1 | 7/2008 | McGough | 713/171 |
| 2008/0229105 A1* | 9/2008 | Jeffries et al. | 713/169 |
| 2009/0037725 A1* | 2/2009 | Farrugia et al. | 713/155 |
| 2009/0067422 A1 | 3/2009 | Poppe | 370/389 |
| 2009/0070871 A1 | 3/2009 | Poppe | 726/22 |
| 2010/0242112 A1 | 9/2010 | Wu et al. | 726/22 |
| 2010/0287610 A1 | 11/2010 | Joffray | 726/19 |
| 2011/0099630 A1 | 4/2011 | Wu et al. | 726/22 |
| 2012/0124383 A1 | 5/2012 | Wu et al. | 713/176 |

OTHER PUBLICATIONS

Aura et al., "Stateless Connections" in *Proc. of International Conference on Information and Communications Security (ICICS '97)*, Lecture Notes in Computer Science, vol. 1334, Springer, Nov. 1997, pp. 87-97.

Perlman, Radia, "Understanding IKEV2: Tutorial, and Rationale for Decisions", draft-ietf-ipsec-ikev2-tutorial-01.txt, Feb. 2003.

Aiello et al., "Efficient, DoS-Resistant, Secure Key Exchange for Internet Protocols", in *Proceedings of the $9^{th}$ ACM Conference on Computer and Communications Security*, Washington, D.C. 2002. 11 pages.

Juels et al., "Client Puzzles: A Cryptographic Countermeasure Against Connection Depletion Attacks", in *Proc. of the Network and Distributed Systems Security Symposium (NDSS '99)*, pp. 151-165, Feb. 1999.

Leiwo, Jussipekka, et al., "Towards Network Denial of Service Resistant Protocols", in *Proc. of the $15^{th}$ International Information Security Conference (IFIP?SEC)*, Aug. 2000, 10 pages.

Aura et al., "DOS-Resistant Authentication with Client Puzzles", in *Proc. of the $8^{th}$ International Workshop on Security Protocols*, Apr. 2000, 8 pages.

* cited by examiner

SYSTEM AND METHOD FOR PROVIDING UNIFIED TRANSPORT AND SECURITY PROTOCOLS

CROSS-REFERENCE TO RELATED APPLICATIONS

This application is related to U.S. patent application Ser. No. 10/956,568, entitled "System and Method for Protecting Network Resources from Denial of Service Attacks," filed Oct. 1, 2004, which issued as U.S. Pat. No. 7,774,841 on Aug. 10, 2010, and to U.S. patent application Ser. No. 11/694,174, entitled "System and Method for Protecting Communication Devices from Denial of Service Attacks," filed Mar. 30, 2007, which issued as U.S. Pat. No. 7,937,759 on May 3, 2011, the contents of which are hereby incorporated by reference in their entirety.

FIELD OF THE INVENTION

The invention generally relates to a system and method for providing unified transport and security protocols, and in particular, to a Secure Frame Layer transport and security protocol that includes stages for initially configuring a requester device and a responder device, identifying the requester device and the responder device to one another, and authenticating message frames communicated between the requester device and the responder device, and further to a Secure Persistent User Datagram Protocol that includes modes for processing message frames received at the requester device and the responder device, recovering the requester device in response to packet loss, retransmitting lost packets communicated between the requester device and the responder device, and updating a location for the requester device to restore connectivity in a communications session between the requester device and the responder device.

BACKGROUND OF THE INVENTION

A denial of service (DoS) attack is a well known problem that can significantly disrupt the operation and performance of network resources. In a typical denial of service attack, a malicious user of the network sends a large number of message frames to a network device within a short period of time in order to "flood" a network with useless data traffic and thereby occupy the resources of responding systems. In particular, servicing the large number of message frames usurps a significant amount of the responding system's processing resources and capabilities, thereby preventing the responding systems from servicing message frames from legitimate users for at least a finite period of time. Indeed, in some circumstances, denial of service attacks have been known to cause network devices to temporarily "crash" such that no message frames can be properly serviced, even those received from legitimate users, for a substantial period of time. Thus, denial of service attacks generally encompass various scenarios in which malicious users attempt to keep a responding system busy processing large number of requests in order to prevent the responding system from serving legitimate users. For example, the characteristics of various known types of denial of service attacks are summarized below.

Smurf Flood Attack: In a typical Smurf Flood Attack, malicious users send a large number of Internet Control Message Protocol (ICMP) echo or ping traffic to a subnet broadcast address with a spoofed return address from a victim's source address. If the hosts in that subnet receive the ICMP echo request, the hosts will reply with an echo reply to the victim's address spoofed in the ICMP echo or ping traffic. When that subnet has a large number of hosts that could potentially reply to each packet, the victim will quickly become overwhelmed with incoming traffic and likely lose network connectivity.

TCP SYN Flood Attack: In a typical TCP SYN Flood Attack, malicious users take advantage of flaws in the Transmission Control Protocol (TCP) three-way handshake process. In particular, malicious users generally provide connection requests that include packets with unreachable source Internet Protocol (IP) addresses to a victim's server. The victim's server therefore cannot complete the connection requests with the unreachable source IP address and thereby wastes network resources. As such, a comparatively small number of illegitimate packets can occupy large amounts of memory, computational, and application resources, thereby shutting down the server.

UDP Flood Attack: The User Datagram Protocol (UDP) provides a connectionless protocol that typically does not require any setup procedures to establish a connection for transferring data. Thus, in a typical UDP Flood Attack, malicious users send UDP packets to random ports on a victim's server. When the UDP packet is received, the victim's server then identifies the application waiting on the destination port. Thus, in response to determining that there is no application waiting on the destination port, the victim's system generates an ICMP packet to a forged source address that identifies an unreachable destination. If enough UDP packets are delivered to the random ports on the victim's server, the server will typically crash.

Ping to Death Attack: In a typical Ping to Death Attack, malicious users create IP packets that exceed the maximum allowable size for IP datagrams (i.e., 65,535 bytes). Thus, when the ICMP packets are reassembled at the destination, a large number of small fragmented ICMP packets that exceed the maximum allowable size for IP datagrams will result, which can cause the victim's system to crash, hang, or reboot.

Chargen Attack: The Chargen Attack has similar characteristics to the UDP Flood Attack, wherein malicious users send forged UDP echo packets to UDP port 19 (chargen) on an intermediary system's. In response to receiving the packets on the chargen service port, the intermediary system then generates a response that includes a character string to the victim's system. The victim's system then receives the packets on the echo service port and generates a response to the chargen service system that includes an echo of the character string. Once this loop begins, bandwidth between the victim's system and the intermediary system can quickly become exhausted.

Tiny Fragment Attack: In a typical Tiny Fragment Attack, malicious users exploit characteristics of many IP implementations that permit an unusually small fragment size to be imposed on outgoing packets. Thus, the malicious users create small fragments to force information from a TCP header into subsequent fragments. For example, a first fragment may only contain eight data octets (i.e., the minimum fragment size), which is sufficient to contain the source port number and destination port number in TCP. However, the small amount of data in the first fragment forces the TCP flags field into subsequent fragments, whereby filters that attempt to drop connection requests will be unable to test the flags in the first octet and consequently ignore the flags in the subsequent fragments. Although having a router enforce rules that govern a minimum size for the first fragment can prevent this type of attack (e.g., requiring the first fragment to be large enough to ensure that the first fragment contains all of the necessary header information), this approach may unnecessarily result in the router dropping small fragments that originate from legitimate sources.

Teardrop Attack: In a typical Teardrop Attack, malicious users attempt to cause the victim's system to hang, crash, reboot, or otherwise fail in a similar manner as in a Ping to Death Attack. However, in the Teardrop Attack, malicious users employ UDP in order to exploit weaknesses in the IP reassembly process. In particular, the malicious users overlap offset fields in a manner that prevents proper reassembly for multiple fragments, which can cause the victim's system to crash, hang, reboot, or otherwise fail.

Land Attack: In a typical Land Attack, malicious users simply send a forged packet that includes a source IP address and an identical destination IP address. As a result, the identical source IP address and destination IP address can confuse the victim's system and cause the victim's to crash, hang, reboot, or otherwise fail.

WinNuke Attack: In a typical WinNuke Attack, malicious users send out of band data to a particular port on a Windows machine known to cause the victim's system to crash.

Overlapping Fragment Attack: The Overlapping Fragment Attack has similar characteristics to the Teardrop Attack in that malicious users employ overlapping fragments. However, rather than causing the victim's system to hang, crash, reboot, or otherwise fail, the Overlapping Fragment Attack employs overlapping fragments to bypass a victim's firewall and gain access to systems that the firewall would otherwise protect. In particular, malicious users overwrite part of the TCP header information in a first fragment, which contains data that is permitted to pass through the firewall, with malicious data then appearing in subsequent fragments. For example, one common technique includes overwriting the destination port number in the TCP header to change the service identified therein (e.g., overwriting port 80 identifying a Hypertext Transfer Protocol service with port 23 identifying a Telnet service, which would not be allowed to pass through the firewall under normal circumstances).

Unnamed Attack: The Unnamed Attack employs similar characteristics to the Teardrop Attack in an attempt to cause a denial of service in the victim's host. However, rather than employing overlapping fragments, the Unnamed Attack instead assembles fragments in a particular manner that creates a gap between the fragments. Specifically, malicious users manipulate an offset value to ensure that parts of the fragments will be skipped, which tends to cause unreliable operating system behavior.

Accordingly, denial of service attacks can be quite costly, especially for network devices that sell products or otherwise generate revenue during operation. In this regard, even if a denial of service causes a network device to crash for only a small amount of time, the lost revenue resulting from the period of inoperativeness can be quite extensive. Although various techniques have been developed for protecting against denial of service attacks, many of the conventional techniques used to protect against denial of service attacks have vulnerabilities that malicious users can exploit in order to successfully launch a denial of service attack. For example, some network devices maintain a list of authorized user identifiers (e.g., a user's IP address or password). Prior to servicing a particular message frame, the device locates the user identifier within the frame and compares the user identifier to a list of stored user identifiers. If a match exists for the user identifier found within the message frame, the device authenticates the message (i.e., validates the message as being from an authorized user), whereas the device discards the message frame without further processing if no match exists. Thus, the device does not significantly process unauthenticated message frames.

Although the foregoing techniques have been somewhat successful in reducing the number and frequency of successful denial of service attacks, malicious users can discover a valid user identifier and thereafter use the misappropriated user identifier to successfully launch an attack against a network device. In this regard, malicious users could use the misappropriated user identifier to spoof the device such the message frames sent by the malicious users are authenticated. In such a situation, the malicious users may successfully launch a spoofed attack even if the network device utilizes user identifier checking to protect against unauthorized access. Although encrypting the user identifier can help to prevent discovery by malicious users, subsequently decrypting user identifiers in message frames tends to require a network device to save a state of the message frame and perform various processes to recover the encrypted user identifier. Thus, the network device could still be susceptible to denial of service attacks because malicious users could transmit enough message frames to keep the network device busy decrypting user identifiers within invalid message frames. Thus, while the network device is occupied decrypting the user identifiers, the network device may be unable to receive and process message frames from authorized users. As a result, user identifiers that are used to protect against denial of service attacks are normally unencrypted, making it easier for malicious users to discover valid user identifiers.

Moreover, techniques for attacking networks using denial of service attacks continue to evolve in a manner that bypasses traditional techniques for preventing such attacks. For example, distributed denial of service (DDoS) attacks have emerged as a sophisticated method for launching denial of service attacks. Distributed denial of service attacks have several characteristics, including the ability to hide the identity of the adversary, identify a legitimate computer as ostensibly initiating the attack, and employ multiple computers that could be located anywhere in the world. In order to counterfeit a legitimate user, malicious users need to hack into a target system and install a latent program that will subsequently initiate the attack against the target system. For example, the malicious user may attack a number of target systems and arrange for a worm or virus program to launch a distributed denial of service attack at a particular time (e.g., if a computer stays connected to a network overnight, the latent program may launch at night and run the attack for a few hours, such that a user arriving the next day would be unaware of the attack that occurred the night before).

One reason leading to the emergence of distributed denial of service attacks relates to the fact that TCP/IP protocols were generally designed with minimal or no security. There are a tremendous number of unsecured computers on the Internet with that have fast network connections, yet existing techniques for protecting network devices from distributed denial of service attacks have not produced a technical silver bullet for preventing this attack. Thus, as new techniques for launching denial of service attacks are continually increasing in their sophistication and complexity, existing systems and techniques tend to fall short in adequately protecting network resources against denial of service attacks.

SUMMARY OF THE INVENTION

According to one aspect of the invention, a system and method for providing unified transport and security protocols may address at least the foregoing drawbacks of existing systems. In particular, the unified transport and security protocols described herein may generally provide a stateless identity based and privacy protected access control filter that can counter denial of service (DoS) and distributed denial of service (DDos) attacks. Furthermore, various features provided by the unified transport and security protocols may provide functionality for managing network transport. For example, in one implementation, the unified transport and security protocols may be combined, with the Stream Control Transmission Protocol (SCTP) to provide a telephony transport mechanism (e.g., in an SS7 signaling system). Moreover, in addition to having functionality that can be combined with or applied to various transport protocols or other network protocols that now exist or may be developed in the future, such as a Long Term Evolution (LTE) protocol designed for use in 4th Generation (4G) communication technologies, the unified transport and security protocols described herein may also be provided at a physical layer to manage network transport and security in various ways.

According to one aspect of the invention, the unified transport and security protocols may generally extend features provided by the User Datagram Protocol (UDP), which typically involves network devices communicating short messages (sometimes referred to as "datagrams") to one another. Network devices often use UDP for communications that relate to real time applications (e.g., video and audio) because UDP provides various features that can avoid connection setup processes, flow control, and retransmission, thereby minimizing transmission delays. However, UDP generally does not provide the reliability and ordering guarantees provided by protocols such as the Transmission Control Protocol (TCP), as datagrams may be dropped without notice or arrive out of order. Nonetheless, without the overhead required to check whether every packet actually arrived, UDP can be faster and more efficient for many lightweight or time sensitive purposes. Furthermore, the stateless nature of UDP makes the protocol useful to servers arranged to respond to a large number of small queries received from a large number of client devices. Thus, the unified transport and security protocols that will be described in further detail herein may include a Secure Frame Layer (SFL) transport and security protocol that can be used to manage data transfer and authentication for packets communicated between network devices, and may further include a privacy protected UDP extension referred to as Secure Persistent UDP (SPUDP), which may address UDP packet loss, maintain communication sessions, and defend against denial of service attacks.

For example, according to one aspect of the invention, the Secure Frame Layer transport and security protocol may be used to prevent denial of service attacks at a requester device and a responder device (e.g., the responder device may authenticate packets received from the requester device via the Secure Frame Layer transport and security protocol, and the requester device may authenticate packets received from the responder device in a similar manner). In particular, to defend both the requester device and the responder device from denial of service attacks, the Secure Frame Layer transport and security protocol may include a stage for initially configuring the requester device and the responder device, a stage for identifying the requester device and the responder device to one another, and a stage for authenticating message frames communicated between the requester device and the responder device. The responder device can therefore determine whether the requester device has permission to access one or more systems protected by the responder device prior to the responder device granting such access or performing any further computations or storing a state for the message frames, thereby preventing denial of service attacks at the responder device and the systems that the responder device protects (and vice versa).

According to one aspect of the invention, the Secure Frame Layer transport and security protocol may include an identity-based privacy protected access control filter, wherein any particular requester device that communicates with a responder device may generate a unique access filter value from a master pre-shared secret key. The master key may be protected with multiple factor keys, such as a password memorized by a user of the requester device, a nonce generated at the requester device, and/or a timestamp generated at the requester device. Thus, because at least some of the master keys are protected by human memory, which are neither stored on the requester device nor sent in network traffic, only legitimate requester devices and responder devices know the information needed to generate the access filter value that permits message frames from the requester device to pass through the access control filter at the responder device. Furthermore, to avoid sniffing and spoofing, access filter values may be used for one message frame only, and then replaced with dynamically updated filter values in subsequent message frames. In one implementation, the filter value may be dynamically expanded and/or minimized to balance considerations between performance and security. For example, in a Virtual Private Network (VPN) system, efficient communications may have more importance than payload security, such that the filter value may be dynamically minimized in such a system to provide flexibility that optimizes the unified transport and security protocols for performance over security. Thus, in one implementation, a length of the filter value may be dynamically varied (e.g., by a user, based on policies for certain applications or situations, such as a particular cipher standard that the protocols have been configured to use).

According to one aspect of the invention, the unified transport and protocols described herein may be used to generate the access filter values from a keyed Hash Message Authentication Code (HMAC), which is less vulnerable to denial of service or distributed denial of service attacks than schemes that are based on signatures or Public Key Infrastructure (PKI) certificates. Because HMAC and other keyed hash functions have less computational overhead than PKI-based or signature-based schemes, the unified transport and security protocols may be suitably implemented on a firewall, an access point, a server, or any other network device that can act as a responder device in accordance with the techniques described herein. Furthermore, the HMAC function may be combined with an Advanced Encryption Standard (AES) with Cipher Block Chaining (CBC) to guarantee data confidentiality and integrity during communication sessions that employ the transport and security protocols to authenticate message frames. In addition, the HMAC function employed herein may generate message authentication codes with the Secure Hash Algorithm-1 (SHA-1), which is cryptographically stronger and provides superior security in Internet Protocol Security (IPSec) than functions that are based on Message-Digest algorithm 5 (MD5).

According to one aspect of the invention, the Secure Frame Layer transport and security protocol may include an Initial Configuration Stage (ICS) that initially configures a requester device and a responder device, a Session Mutual Authentication Stage (SMAS) that identifies the requester device and the responder device to one another, and a Dynamic Data Communication Stage (DDCS) that authenticates subsequent message frames that the requester device may communicate to the responder device. Furthermore, the Secure Persistent UDP transport and security protocol may include a receive mode in which the responder device may authenticate message frames from the requester device and update the access filter value for the requester device as appropriate, a recovery mode in which the requester device can be reset in response to losing one or more message frames sent to the responder device, a retransmission mode in which the requester device can attempt to resend the lost message frames to the responder device in order to avoid packet loss, and an update mode in which the requester device updates location information to restore connectivity in a communications session with the responder device. The transport and security protocols may also be designed in accordance with stateless principles in order to prevent denial of service or distributed denial of service attacks.

According to one aspect of the invention, the Initial Configuration Stage may initially configure the requester device and the responder device with the SFL and SPUDP transport and security protocols. For example, the requester device and the responder device may generate respective master secret keys and then exchange the respective master secret keys with one another, whereby the exchanged master secret keys may provide pre-shared secrets known to the requester device and the responder device. In addition, the pre-shared secrets exchanged between the requester device and the responder device may further include a nonce and a timestamp generated at the requester device, and a nonce and a timestamp generated at the responder device. As such, exchanging the pre-shared secrets may register the requester device with the responder device (and vice versa), wherein the responder device may then generate an initial access filter value for the legitimate requester device from the pre-shared secrets. The requester device may then store the initial access filter value in a responder table that lists various unique access filter values for all legitimate requester devices, wherein the requester device may reference the unique access filter values in the responder table to authenticate message frames received from any particular requester device. For example, the requester device may generate the initial access filter value from the pre-shared secrets and insert the initial access filter value within a message frame communicated to the responder device, whereby the responder device can authenticate the message frame communicated from the requester device in response to the access filter value within the message frame matching the access filter value stored in the responder table.

According to one aspect of the invention, the Initial Configuration Stage may further include generating a local master key at the requester device and comparing the local master key to the master key that the responder device exchanged with the requester device. In particular, the responder device may generate the master key exchanged with the requester device from the user name and password for the legitimate user of the requester device in addition to a nonce and a timestamp generated at the responder device. The user name, password, nonce, and timestamp may provide seeds to the HMAC function that the responder device and the requester device use to generate the master key and the access filter value. Thus, the pre-shared secrets exchanged with the requester device may include the nonce and the timestamp used to generate the master key at the responder device, as well as the master key generated from the nonce, the timestamp, and the user name and the password for the legitimate user of the requester device. As such, a user name and a password may be entered at the requester device during the local login session, which in addition to the nonce and the timestamp received from the responder device, provide seeds to the HMAC function executed at the requester device. The requester device may then generate the local master key using the HMAC function and compare the local master key to the master key received from the responder device. Unless the user name and password locally entered at the requester device are incorrect, the local master key will match the master key received from the responder device, such that the requester device may locally determine whether the login was from a legitimate user prior to even attempting to establish a connection with the responder device.

According to one aspect of the invention, in response to completing the Initial Configuration Stage that initially configures the requester device and the responder device, the requester device and the responder device may perform the Session Mutual Authentication Stage (SMAS) of the Secure Frame Layer transport and security protocol. For example, the Session Mutual Authentication Stage may operate as a two-way handshake process, which may begin with the responder device receiving a SYN packet from the requester device. In particular, the requester device may provide one or more seeds to a keyed hash function in order to generate an initial access filter value for the requester device, wherein the SYN packet received at the responder device may include the initial access filter value generated from the keyed hash function at the requester device. The responder device may then compare the initial access filter value, in the SYN packet to the pre-computed initial access filter value stored for the requester device to authenticate the requester device and further process the SYN packet such that the requester device can mutually authenticate the responder device. In particular, the SYN packet received at the responder device may include one or more secrets generated at the requester device in addition to the initial access filter value, wherein the secrets included in the SYN packet may provide pre-shared secrets that the requester device can use to mutually authenticate the responder device. For example, the secrets in the SYN packet may include an encrypted nonce and an encrypted time stamp generated at the requester device, such that the responder device may generate an access filter value for the responder device from the decrypted secrets. The responder device may then insert the access filter value calculated from the decrypted secrets within an ACK packet, which the requester device may use to authenticate the responder device.

According to one aspect of the invention, in response to completing the Session Mutual Authentication Stage that identifies the requester device and the responder device to one another, the requester device and the responder device may perform the Dynamic Data Communication Stage (DDCS) of the Secure Frame Layer transport and security protocol. For example, the Dynamic Data Communication Stage may handle ordered data transfer between the requester device and the responder device and/or initiate one or more modes of the SPUDP transport and security protocol to handle retransmission of lost packets communicated between the requester device and the responder device, update location information for the requester device to restore connectivity between the requester device and the responder device, and recover the requester device in response to losing the connectivity between the requester device and the responder device, among other things.

According to one aspect of the invention, the Dynamic Data Communication Stage of the Secure Frame Layer transport and security protocol may begin with the responder device receiving a SYN packet that contains an encrypted message from the requester device. The responder device may then decrypt the message contained in the packet received from the requester device and check the decrypted message for one or more conditions. For example, the responder device may check whether the decrypted message includes a logoff indication from the requester device, in which case the responder device may initiate the SPUDP recovery mode that will be described in further detail below. In addition, the responder device may check whether the decrypted message includes a request to update a location of the requester device, in which case the responder device may initiate the SPUDP update mode that will be described in further detail below. Moreover, the packet received from the requester device in may further include an access filter value for the requester device and updated encrypted secrets generated at the responder device that the responder device uses to authenticate a subsequent message frame received from the requester device, and a checksum, which the responder device uses to authenticate the message frame received from the requester device.

According to one aspect of the invention, the receive mode of the Secure Persistent User Datagram Protocol may be used at the requester device and the responder device to authenticate message frames received from one another in a similar manner as described above. In addition, in response to the requester device or the responder device determining that a particular message frame does not include a valid access filter value, the relevant responder device may check whether the requester device has exceeded a maximum number of allowable attempts to communicate a valid access filter value. If the requester device has exceeded the maximum number of allowable attempts, the responder device may initiate the SPUDP recovery mode to reset the requester device. However, in response to determining that the requester device has not exceeded the maximum number of allowable attempts, the responder device may determine whether the requester device has completed the SMAS two-way handshake described above (e.g., if the requester device has not previously completed the SMAS two-way handshake, the responder device may return the current packet to the responder device, otherwise the responder device may send the requester device a previous packet that the responder device received from the responder device). The responder device may then further process the packet based on the SMAS status of the responder device.

According to one aspect of the invention, the recovery mode of the Secure Persistent User Datagram Protocol may be initiated, as appropriate, in response to circumstances indicating that the requester device may need to be reset (e.g., exceeding the maximum number of allowable attempts to send a packet that contains a valid access filter value). Thus, the initial access filter value created during the Initial Configuration Stage described above may be stored at the responder device, wherein the initial access filter value may be used to reestablish or otherwise recover a potentially disrupted session between the requester device and the responder device. Furthermore, in response to reestablishing or otherwise recovering the session between the requester device and the responder device, the initial access filter value may be dynamically updated for subsequent message frames communicated between the requester device and the responder device until the session has been properly closed (e.g., with the requester device sending a proper logoff indication, such as a "BYE" message).

According to one aspect of the invention, the retransmission mode of the Secure Persistent User Datagram Protocol may be performed whenever the requester device sends a packet to the responder device or the responder device sends a packet to the requester device. The relevant device that sends the packet may initiate the SPUDP retransmission mode to recover the packet in response to the packet being lost or otherwise failing to reach an intended destination of the packet. For example, the SPUDP retransmission mode may include the requester device setting a round trip timer for the packet sent to the responder device. The round trip timer may define a time period to complete a round trip communication that begins with the requester device sending the packet to the responder device and ends with the responder device receiving the responsive packet from the requester device. Thus, in response to sending the packet to the responder device, the round trip timer may start and the requester device may determine whether a legitimate responsive packet has been received from the responder device prior to the round trip timer expiring. For example, in response to the requester device not receiving the legitimate responsive packet from the responder device prior to the round trip timer expiring, the requester device may assume that the packet sent to the responder device was dropped, lost, or otherwise failed to reach the requester device. The requester device may then attempt to retransmit the packet to the responder device until a maximum number of attempts have been made to send the packet to the responder device. Thus, the requester device may continue to attempt to retransmit the packet that was lost or otherwise failed to the responder device until a timely response is received prior to expiration of the round trip time period or the maximum number of retransmission attempts has been reached. In the latter case, the SPUDP recovery mode may be initiated to reset the requester device, whereas in the former case, the response may be processed and the access filter value may be appropriately updated for subsequent message frames.

According to one aspect of the invention, the update mode of the Secure Persistent User Datagram Protocol may generally be used to maintain connectivity between the requester device and the responder device. In particular, in response to the requester device detecting that a predetermined inactivity period has expired, the SPUDP update mode may be initiated (e.g., because the lack of receive activity at the requester device may reflect a disruption or loss in connectivity for a session between the requester device and the responder device due to the responder device having outdated location information for the requester device). Thus, the SPUDP update mode may include the requester device sending an update request to the responder device, wherein the update request may include an updated IP address, an updated port number, or other updated location information for the requester device. Furthermore, any timers associated with any of the Secure Frame Layer stages or SPUDP modes described above may be reset and the requester device may receive updated secrets and an updated access filter value from the responder device. The requester device may then authenticate the responder device based on the updated access filter value, and may further generate an updated access filter value from the updated secrets received from the responder device. Thus, the responder device can use the updated access filter value generated at the requester device from the updated secrets to authenticate a subsequent message frame from the requester device, such that dynamically updating the access filter values can be resumed for subsequent message frames communicated between the requester device and the responder device in a similar manner as described in further detail above.

Other objects and advantages of the invention will be apparent to those skilled in the art based on the following drawings and detailed description.

DETAILED DESCRIPTION

Figure 1:
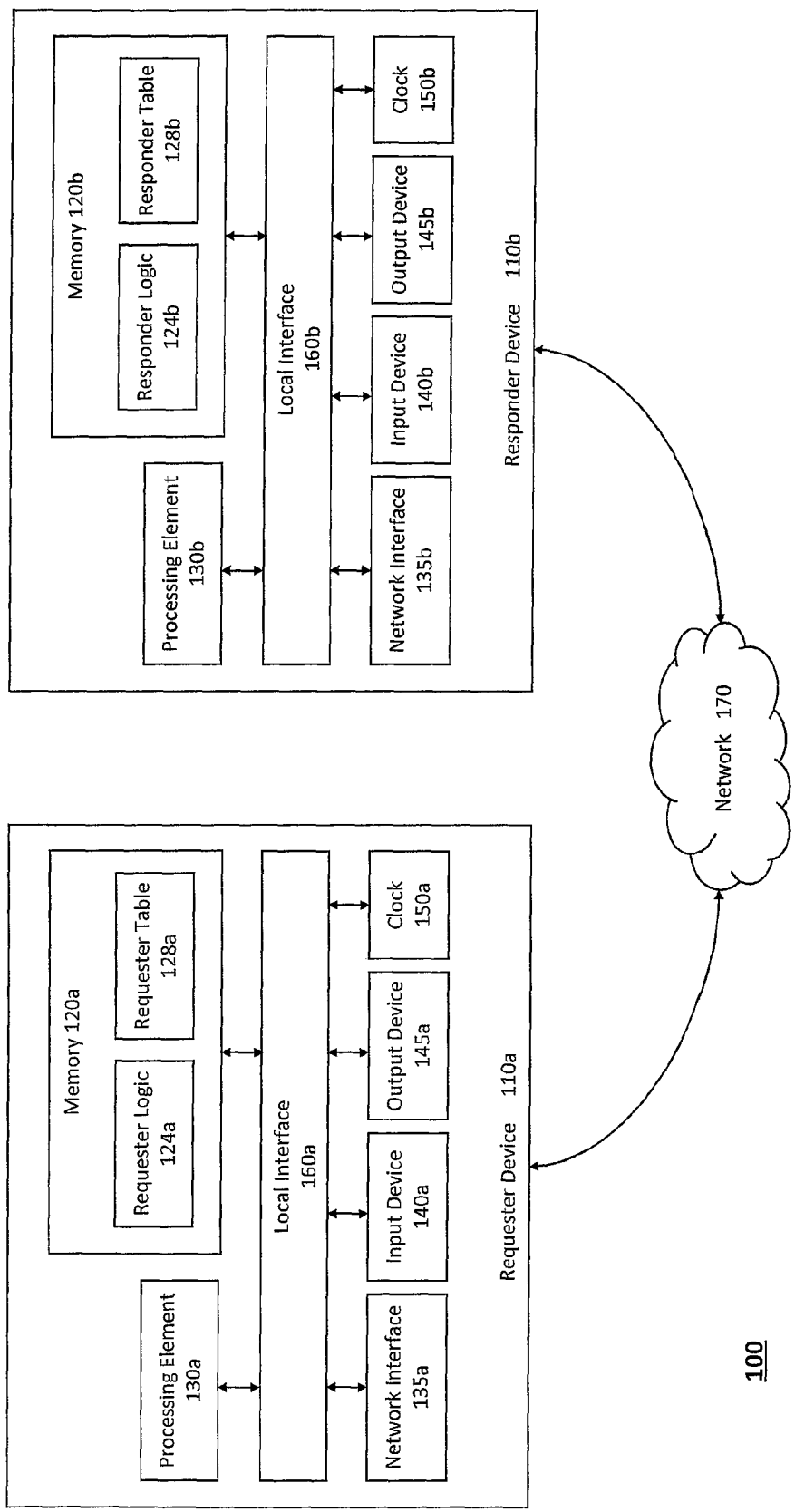
FIG. 1 illustrates a block diagram of an exemplary system for providing unified transport and security protocols, according to one aspect of the invention.

According to one aspect of the invention, FIG. 1 illustrates an exemplary system 100 for providing unified transport and security protocols to prevent denial of service attacks. In particular, the present disclosure generally pertains to a transport and security protocol that provides an identity based and privacy protected access control filter that can counter denial of service (DoS) and distributed denial of service (DDos) attacks. In one implementation, the transport and security protocol described in further detail herein may be considered stateless because the system 100 employing the transport and security protocol does not create a state for an authentication request unless the system 100 determines that the authentication request originates from a legitimate user. Moreover, the transport and security protocol can be considered stateless for both a client device and an authentication server because both the client device and the authentication server can use the transport and security protocol to authenticate each other.

As such, in one implementation, the system 100 illustrated in FIG. 1 may generally include a requester device 110a corresponding to the client device and a responder device 110b corresponding to the authentication server, wherein the requester device 110a may communicate authentication requests to the responder device 110b over a network 170. Alternatively, because both the client device and the authentication server can use the transport and security protocol to authenticate one another, the system 100 may be similarly implemented to have the requester device 110a correspond to the authentication server and the responder device 110b correspond to the client device, as described in further detail in U.S. patent application Ser. No. 10/956,568 and U.S. patent application Ser. No. 11/694,174, the contents of which are incorporated by reference above.

In one implementation, the responder device 110b may generally refer to any suitable network resource (e.g., a server, gateway, firewall, virtual private network, etc.) that can respond to message frame from another communication device. As such, in one implementation, the requester device 110a may operate as the responder device 110b and vice versa, as appropriate. In particular, message frames communicated between the requester device 110a and the responder device 110b may be authenticated via the transport and security protocol described herein. For example, the responder device 110b may generally include a memory 120b that stores a parameter (referred to herein as an "access filter value"), which may be generated from one or more pre-shared secrets known to the requester device 110a and the responder device 110b. The responder device 110b may execute responder logic 124b to generate the access filter value for the requester device 110a and then store the access filter value in a responder table 128b, and the responder table 128b may further store a unique identifier for the requester device 110a in connection with the access filter value generated for the requester device 110a, whereby the access filter value uniquely represents an identity for the requester device 110a that only a legitimate client device and authentication server can determine.

Thus, in one implementation, the requester device 110a may execute requester logic 124a that is substantially similar to the responder logic 124b to determine the access filter value stored in the responder table 128b, wherein the requester device 110a may insert the access filter value within a message frame transmitted to the responder device 110b. In particular, any message frames transmitted to the responder device 110b from the requester device 110a may include a destination identifier (e.g., an IP address) that uniquely identifies the responder device 110b. In response to determining that the destination identifier in the message frames identifies the responder device 110b, the network 170 may route the message frames to the responder device 110b. The responder device 110b may then execute the responder logic 124b to process the message frames, as described in further detail herein. Similarly, any message frames transmitted to the requester device 110a from the responder device 110b may include a destination identifier (e.g., an IP address) that uniquely identifies the requester device 110a, wherein the network 170 may then route the message frames to the responder device 110b. The requester device 110a may then execute the requester logic 124a to process the message frames in a similar manner, as described in further detail herein.

In one implementation, in response to receiving an incoming message frame from the requester device 110a, the responder device 110b may reference the access filter value stored in the memory 120b to determine whether or not to authenticate the incoming message frame. In particular, the responder device 110b may compare the access filter value that the requester device 110a inserted within the incoming message frame to the access filter value previously stored in the responder table 128b. In response to determining that the access filter values match or otherwise correspond, the responder device 110b may authenticate and further process the message frame, whereas the responder device 110b may discard the message frame in response to determining that the access filter values do not match or otherwise correspond. As such, rather than having to perform intensive computation to authenticate message frames, the responder device 110b may compare the access filter value in the incoming message frame with the access filter value stored in the responder table 128b in a relatively short period of time.

Furthermore, to protect the privacy of both the requester device 110a and the responder device 110b, the responder device 110b may generate a new access filter value for the requester device 110a in response to authenticating any particular message frame, whereby the access filter value may change for every message frame communicated between the requester device 110a and the responder device 110b. In this regard, the responder device 110b does not have to save a state of the message frame to decide whether or not to discard the message frame, whereby the responder device 110b can accept or reject a current message frame prior to evaluating subsequent message frames. Thus, even if a malicious user transmits a substantial number of message frames in a relatively short period of time, the responder device 110b can reject the message frames from the malicious user without preventing the responder device 110b from processing other message frames that may originate from authorized users. As such, attempted denial of service attacks can be prevented.

In one implementation, the access filter value stored in the responder table 128b may be periodically updated (e.g., each time that the responder device 110b receives a message frame from an authorized requester device 110a or transmits a message frame to the an authorized requester device 110a), and the requester logic 124a at the requester device 110a may be provided with sufficient information to determine the updated access filter value. Thus, even if a malicious user intercepts or otherwise discovers a particular access filter value, the malicious user will be unable to utilize such access filter value to spoof the responder device 110b and successfully launch a denial of service attack. In particular, the responder device 110b can reject authenticate message frames from the malicious user that include the intercepted or otherwise discovered access filter value because the access filter value contained in such message frames will not match or otherwise correspond to the updated access filter value in the responder table 128b. Further, as noted above, similar techniques may be employed to protect the requester device 110a from denial of service attacks.

In one implementation, the requester logic 124a executed on the requester device 110a and the responder logic 124b executed on the responder device 110a may be implemented in software and stored within the respective memories 120a and 120b at the requester device 110a and the responder device 124b. However, as will be apparent, the requester logic 124a and the requester logic 124a may alternatively be implemented in hardware, software, or any suitable combination thereof. Furthermore, as illustrated in FIG. 1, the requester device 110a and the responder device 110b may respectively comprise one or more processing elements 130a and 130b (e.g., a digital signal processor, a central processing unit, etc.), which communicates with and drives other components within the requester device 110a and the responder device 110b via respective local interfaces 160a and 160b (e.g., one or more buses). In one implementation, if the requester logic 124a and/or the responder logic 124b comprise software, the processing elements 130a and 130b may execute instructions corresponding to the requester logic 124a and/or the responder logic 124b.

Furthermore, in one implementation, the requester device 110a and the responder device 110b may comprise respective input devices 140a and 140b (e.g., a keyboard, mouse, etc.), which can be used to input data to the requester device 110a and the responder device 110b, and may further comprise respective output devices 145a and 145b (e.g., a printer, a monitor, etc.), which can be used to output data from the requester device 110a and the responder device 110b. In one implementation, the requester device 110a and the responder device 110b may be coupled to the network 170 through respective network interfaces 135a and 135b (e.g., a modem, network card, wireless or wired channel, etc.) that enables the requester device 110a and the responder device 110b to communicate with one another over the network 170. Further, the requester device 110a and the responder device 110b may comprise respective clocks 150a and 150b that can track a current time and provide data indicative of the current time to the requester device 110a and the responder device 110b. For example, the clocks 150a and 150b may provide a "time stamp" that indicates the current time when the time stamp was generated.

In one implementation, as noted above, the responder logic 124b may maintain a responder table 128b that includes an access filter value for various users that are authorized to access the responder device 110b. In one implementation, the responder table 128b may comprise n entries, where n may comprise any suitable positive integer. For example, each entry in the responder table 128b may have a user identifier (e.g., an IP address) that uniquely identifies an authorized user or device and an access filter value uniquely generated for such authorized users or devices. Thus, in one implementation, the access filter value may be considered an identity-based filter based on one or more pre-shared secrets known to the requester device 110a and the responder device 110b, wherein the pre-shared secrets can include multiple factors that do not expose private information over the network 170 (e.g., actual passwords or authentication credentials). Further, in one implementation, a multiple factor feature may be employed to protect master secrets for the requester device 110a and the responder device 110b from offline dictionary attacks that attempt to crack the passwords, authentication credentials, or other private information.

Rather, both the requester device 110a and the responder device 110b may have unique one-time access filter values, which may vary dynamically in each message frame according to a time dependent scheme, wherein only legitimate requester devices 110a and legitimate responder devices 110b know the pre-shared secrets needed to calculate the other's access filter values. Accordingly, in response to the access filter value in a message frame sent from the requester device 110a not matching the corresponding access filter value stored in the responder table 128b for the requester device 110a (and vice versa), the responder device 110b may block or drop the message frame without committing further resources to processing the message frame. In this manner, the access filter value based on pre-shared secrets known to the requester device 110a and the responder device 110b may prevent denial of service attacks directed at either the requester device 110a or the responder device 110b.

Figure 2:
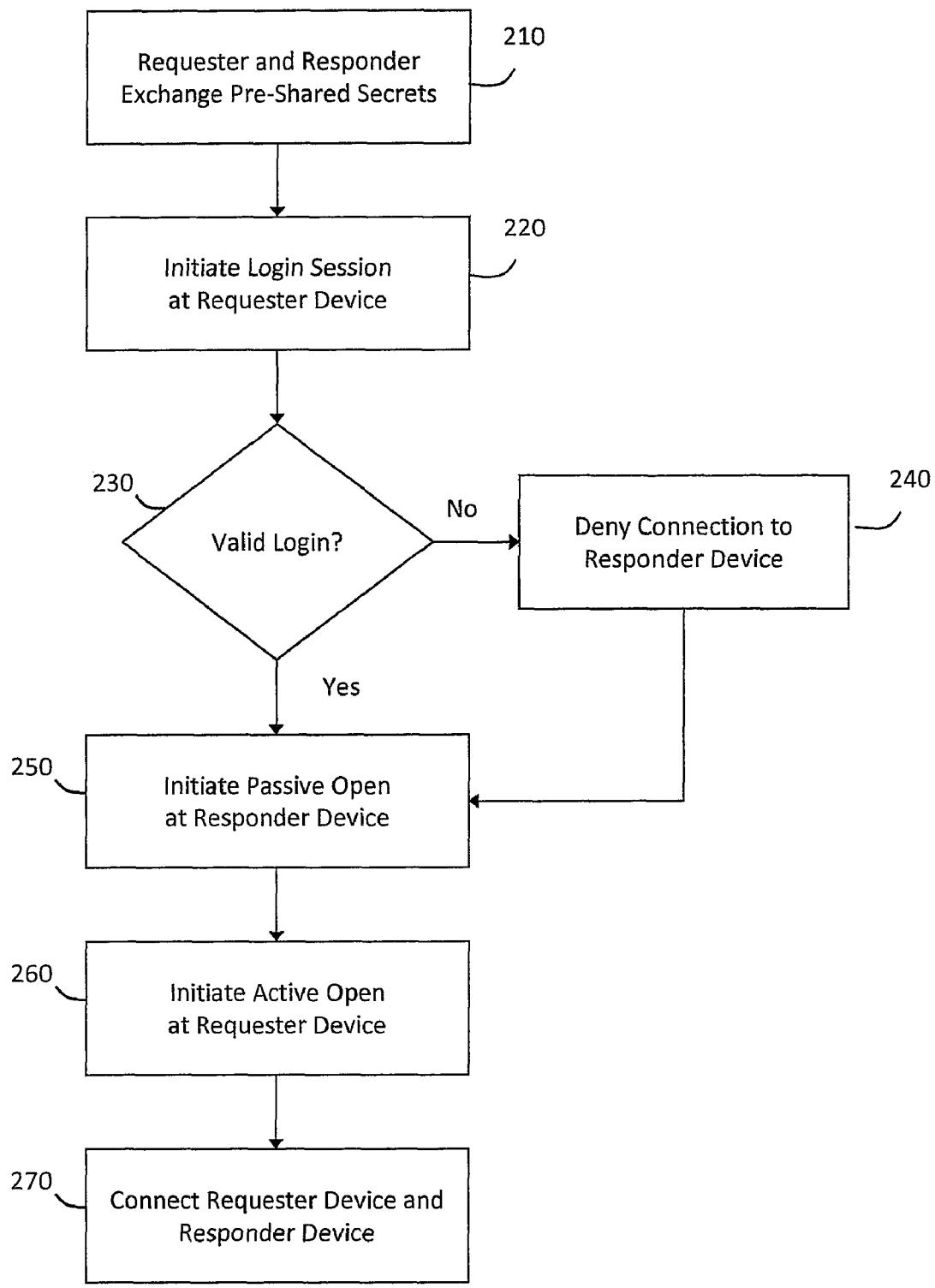
FIGS. 2-4 illustrate flow diagrams of exemplary methods for providing a Secure Frame Layer transport and security protocol at the requester device and the responder device depicted in FIG. 1, according to one aspect of the invention.
Figure 3:
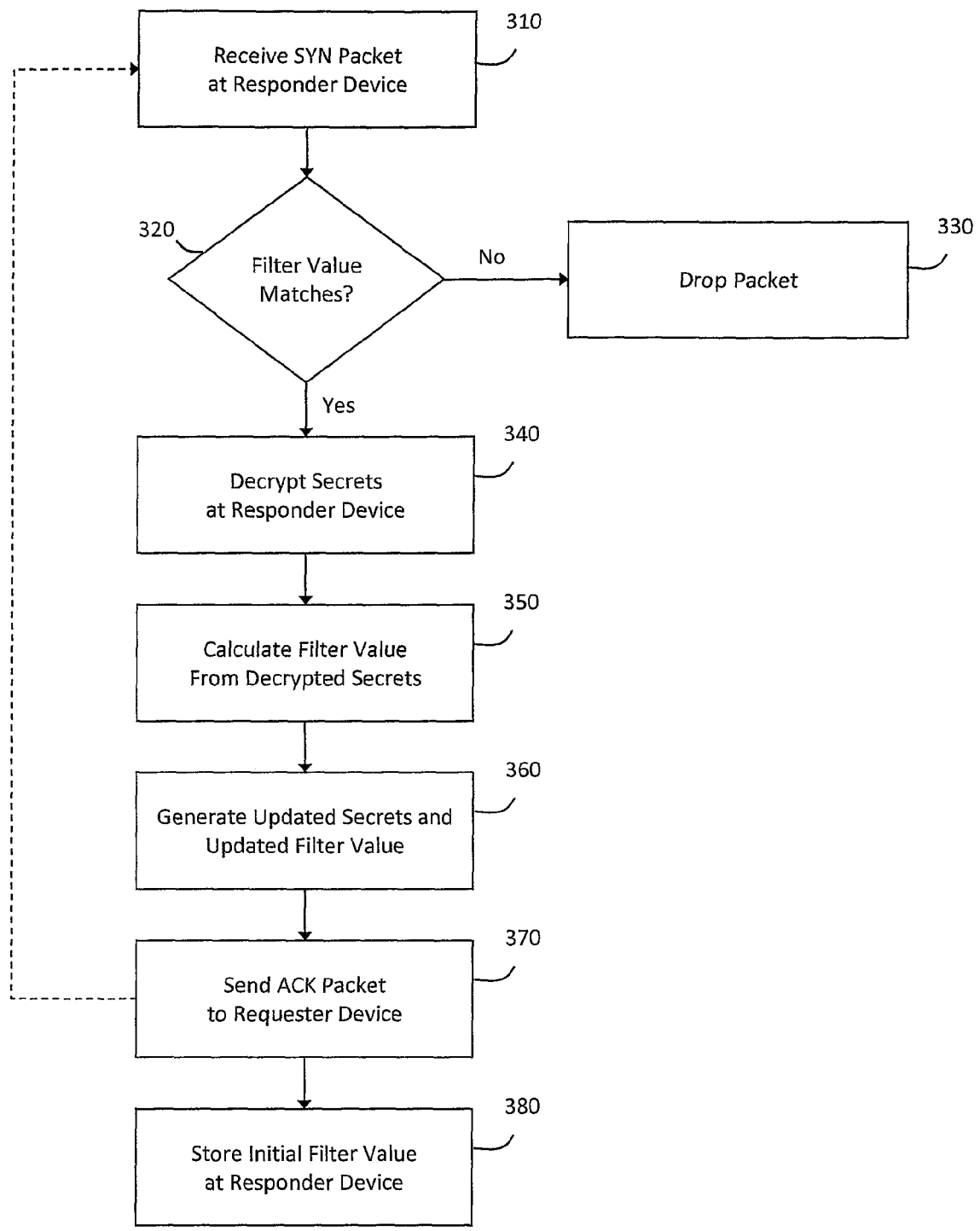
Figure 4:
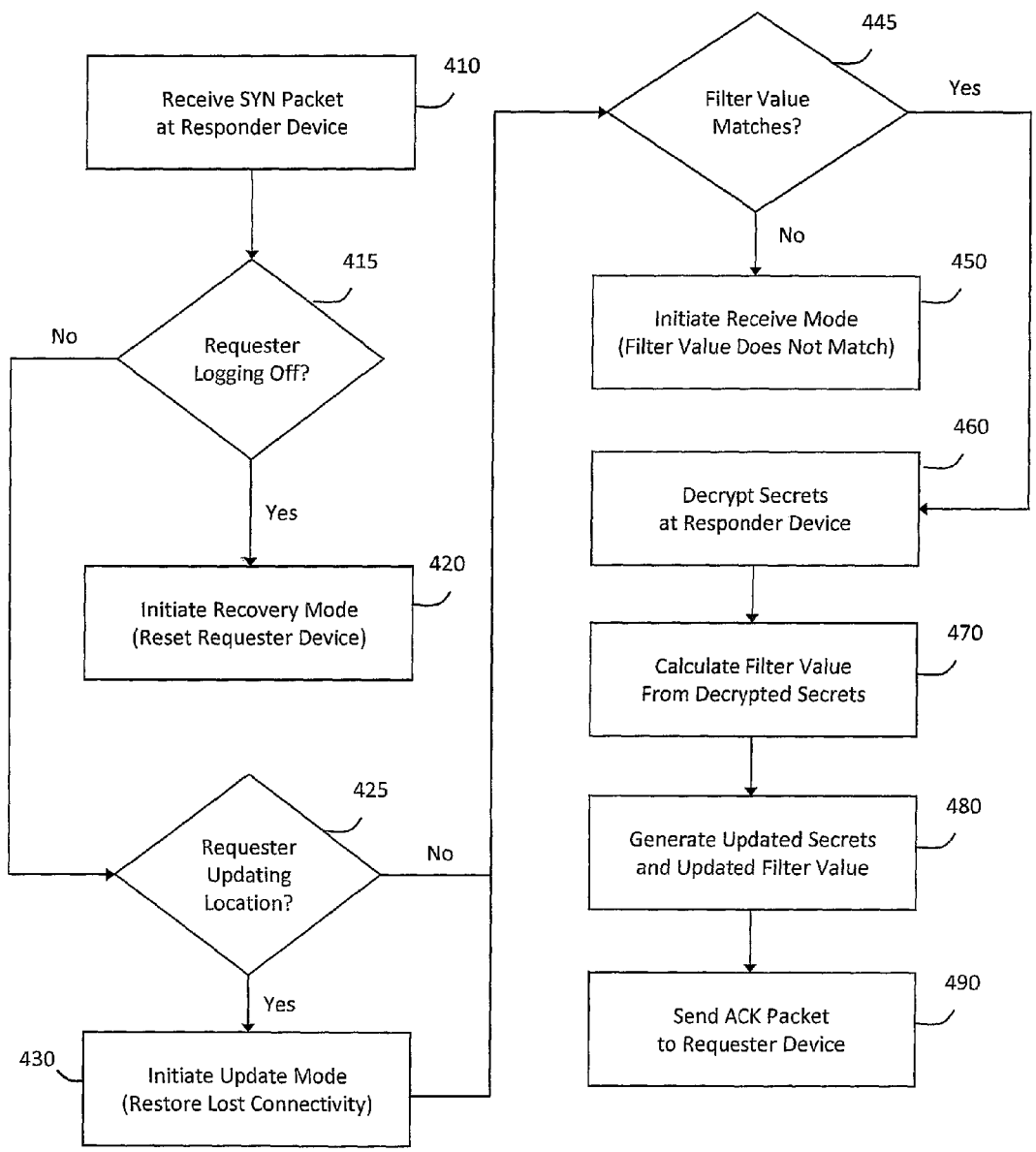

According to various aspects of the invention, FIGS. 2-4 illustrate flow diagrams of exemplary methods for providing a Secure Frame Layer (SFL) transport and security protocol to prevent denial of service attacks at the requester device and the responder device depicted in FIG. 1. In particular, to defend both the requester device and the responder device from denial of service attacks, the exemplary method illustrated in FIG. 2 may initially configure the requester device and the responder device with the SFL transport and security protocol, while the exemplary methods illustrated in FIGS. 3-4 may be used to authenticate subsequent message frames communicated between the requester device and the responder device according to the SFL transport and security protocol. In this manner, the responder device can determine whether the requester device has permission to access one or more systems protected by the responder device prior to the responder device granting such access or performing any further computations or storing any state information for the message frames, thereby preventing denial of service attacks at the responder device and any systems that the responder device protects (and vice versa). Additionally, because the SFL transport and security protocol can protect both the responder device and the requester device from denial of service attacks, any further description relating to the requester device will be understood as referring to the device that communicates a message frame, while any further description relating to the responder device will be understood as referring to the device that receives and determines whether to authenticate the message frame.

As noted above, the Secure Frame Layer transport and security protocol described herein may include an identity-based privacy protected access control filter, wherein any particular requester device that communicates with a responder device may generate a unique access filter value from a master pre-shared secret key. In one implementation, the master key may be protected with multiple factor keys (e.g., the master key may be generated from a password memorized by a user of the requester device, a nonce generated at the requester device, and a timestamp generated at the requester device). Thus, because passwords and identifiers for requester devices are protected by human memory, which are neither stored on the requester device nor sent in network traffic, only legitimate requester devices and responder devices know the information needed to generate the access filter value that permits message frames from the requester device to pass through the access control filter at the responder device. Moreover, protecting anonymity for the passwords, identifiers, or other identity information may protect privacy for requester devices that communicate over public networks. Furthermore, to avoid sniffing and spoofing, filter values may be used for one message frame only, and then replaced with dynamically updated filter values in subsequent message frames.

In one implementation, the unified transport and security protocols described herein may generally include the Secure Frame Layer (SFL) transport and security protocol and a Secure Persistent User Datagram Protocol (SPUDP). For example, as will be described in greater detail herein, the access filter values generated in the SFL transport and security protocol and the SPUDP transport and security protocol may use a keyed Hash Message Authentication Code (HMAC), which is less vulnerable to denial of service or distributed denial of service attacks than schemes that are based on signatures or Public Key Infrastructure (PKI) certificates. Additionally, because HMAC and other keyed hash functions have less computational overhead than PKI-based or signature-based schemes, the transport and security protocols may be suitably implemented on a firewall, an access point, a server, or any other network device that can act as a responder device in accordance with the techniques described herein. Furthermore, in one implementation, the HMAC may be used in combination with an Advanced Encryption Standard (AES) with Cipher Block Chaining (CBC) to guarantee data confidentiality and integrity during communication sessions that employ the SFL and SPUDP transport and security protocols to authenticate message frames. In addition, in one implementation, the HMAC function employed herein may generate message authentication codes with the Secure Hash Algorithm-1 (SHA-1), which is cryptographically stronger and provides superior security in Internet Protocol Security (IPSec) than functions that are based on Message-Digest algorithm 5 (MD5).

In one implementation, the SFL transport and security protocol may include an Initial Configuration Stage (ICS) that includes initially configuring a requester device and a responder device, a Session Mutual Authentication Stage (SMAS) that identifies the requester device and the responder device to one another, and a Dynamic Data Communication Stage (DDCS) that authenticates subsequent message frames that the requester device may communicate to the responder device. Further, in one implementation, the SPUDP transport and security protocol may include a receive mode in which the responder device may receive a message frame (or "datagram") from the requester device at any particular time and then update the access filter value for the requester device as appropriate, a recovery mode in which the requester device can be reset in response to losing one or more message frames sent to the responder device, a retransmission mode in which the requester device can attempt to resend the lost message frames to the responder device in order to avoid packet loss, and an update mode in which the requester device updates an IP address, a port number, or other location information to restore connectivity in a communications session with the responder device. In one implementation, the SFL transport and security protocol and the SPUDP transport and security protocol may also be designed in accordance with the stateless principles described above in order to prevent denial of service or distributed denial of service attacks.

Accordingly, one aspect of providing transport and security protocols to prevent denial of service attacks may include initially configuring the requester device and the responder device with the SFL and SPUDP transport and security protocols, as illustrated in flow diagram for the exemplary method illustrated in FIG. 2. For example, the method illustrated in FIG. 2 may include the requester device and the responder device generating respective master secret keys in an operation 210. The requester device and the responder device may then exchange their respective master secret keys with one another, whereby the exchanged master secret keys may provide pre-shared secrets known to the requester device and the responder device. In addition, the pre-shared secrets exchanged between the requester device and the responder device may further include a nonce and a timestamp generated at the requester device, and a nonce and a timestamp generated at the responder device. In one implementation, the pre-shared secrets may be exchanged over a secure communications channel, or a trusted third party may securely deliver the pre-shared secrets to the requester device and the responder device, although any other technique may be suitably employed to ensure that the pre-shared secrets are securely exchanged between the requester device and the responder device.

As such, exchanging the pre-shared secrets in operation 210 may register the requester device with the responder device, wherein the responder device may then generate an initial access filter value for the legitimate requester device from the pre-shared secrets. The requester device may then store the initial access filter value in a responder table that lists various unique access filter values for all legitimate requester devices, wherein the requester device may reference the unique access filter values in the responder table to authenticate message frames received from any particular requester device. For example, as noted above, the requester device may generate the initial access filter value from the pre-shared secrets in a similar manner as the responder device and then insert the initial access filter value within a subsequent message frame communicated to the responder device. As a result, the responder device may authenticate the message frame communicated from the requester device in response to the access filter value within the message frame matching the access filter value stored in the responder table. Otherwise, the responder device may drop or block the message frame without committing any further resources to processing the message frame.

Furthermore, in one implementation, the pre-shared secrets stored at the requester device may be paired with one or more additional keys (e.g., a user name and a password memorized by a legitimate user of the requester device) to avoid against malicious activity that may be directed through other legitimate requester devices. Thus, the initial configuration method illustrated in FIG. 2 may further include a local login session initiated at the requester device in an operation 220. For example, the user name, password, or other private login information for the legitimate user of the requester device may be required to establish any particular communication session between the requester device and the responder device. Moreover, in one implementation, preferably the user name, password, or other private login information may not be stored on the requester device (e.g., to prevent malicious users from compromising the requester device and thereby gaining access to the information used to generate the master key).

As such, in one implementation, operation 220 may include generating a local master key at the requester device and comparing the local master key to the master key that the responder device exchanged with the requester device in operation 210. In particular, the responder device may generate the master key exchanged with the requester device from the user name and password for the legitimate user of the requester device in addition to a nonce and a timestamp generated at the responder device. For example, the user name, password, nonce, and timestamp may provide seeds to the HMAC SHA-1 function that the responder device and the requester device use to generate the master key and the access filter value. Thus, the pre-shared secrets exchanged in operation 210 may include the nonce and the timestamp used to generate the master key at the responder device, as well as the master key generated from the nonce, the timestamp, and the user name and the password for the legitimate user of the requester device. As such, a user name and a password may be entered at the requester device during the local login session in operation 220, which in addition to the nonce and the timestamp received from the responder device, provide seeds to the HMAC SHA-1 function executed at the requester device.

Thus, the requester device may then generate the local master key using the HMAC SHA-1 function, with the seeds to the HMAC SHA-1 function being the nonce received from the responder device, the timestamp received from the responder device, and the user name and password locally entered at the requester device. The local master key may then be compared to the master key received from the responder device in an operation 230, wherein the local master key will not match the master key received from the responder device if the user name and password locally entered at the requester device are incorrect. In response to determining that the local master key does not match the master key received from the responder device in operation 230, the login may be considered invalid and the requester device may locally deny a connection to the responder device in an operation 240 (i.e., the master keys will not match if the locally entered user name and password do not correspond to the user name and password provided as seeds to the HMAC SHA-1 function at the responder device). On the other hand, in response to determining that the local master key matches the master key received from the responder device in operation 230, the login may be considered valid and the connection to the responder device may be initiated in an operation 250. Thus, the login session initiated in operation 220 and validated in operation 230 may provide local protection at the requester device that does not require any network connection (e.g., to prevent attackers from sniffing the login information, protect the user name and password from dictionary attacks, etc.).

As noted above, the connection between the requester device and the responder device may be initiated in operation 250 in response to validating the local login session at the requester device. For example, in one implementation, a two frame stateless handshake may be used to establish the connection between the requester device and the responder device. In particular, prior to the requester device attempting to connect with the responder device, the responder device may initiate a passive open in operation 250. The passive open initiated in operation 250 may generally include the responder device binding to a port in order to open the port for connections. In response to establishing the passive open at the responder device, the requester device may then initiate an active open in an operation 260. For example, the active open may include the two frame stateless handshake mentioned above, wherein the requester, device sends the responder device a SYN message that contains an access filter value generated from the pre-shared secrets. In response to the access filter value contained in the SYN message matching an access filter value that the responder device has stored for the requester device, the responder device may reply to the SYN message with a SYN-ACK message that contains an access filter value that the requester device can use to authenticate the responder device. As such, in response to the responder device and the requester device authenticating one another with the respective access filter values contained in the SYN message and the SYN-ACK message, the connection between the requester device and the responder device may be established in operation 260.

According to one aspect of the invention, in response to completing the Initial Configuration Stage that initially configures the requester device and the responder device with the transport and security protocols described herein (e.g., as illustrated in FIG. 2 and described above), the requester device and the responder device may perform the Session Mutual Authentication Stage (SMAS) of the Secure Frame Layer (SFL) transport and security protocol. For example, in one implementation, the Session Mutual Authentication Stage may be performed according to the method illustrated in FIG. 3, wherein the SMAS may operate as a handshake process in Transmission Control Protocol (TCP). However, as will be described in greater detail herein, the SMAS may operate as a two-way handshake process, whereas TCP generally employs a three-way handshake process.

In one implementation, the Session Mutual Authentication Stage of the Secure Frame Layer transport and security protocol may begin with the responder device receiving a SYN packet from the requester device in an operation 310. In particular, the requester device may provide one or more seeds to a keyed hash function in order to generate an initial access filter value for the requester device, wherein the SYN packet received at the responder device in operation 310 may include the initial access filter value generated from the keyed hash function at the requester device. For example, in one implementation, the seeds provided to the keyed hash function at the requester device may include a user name for the requester device, a master key for the requester device (e.g., a password), and the pre-shared secrets that the responder device exchanged with the responder device in the Initial Configuration Stage described above (e.g., a nonce and a time stamp that the responder device generates and exchanges with the requester device).

Thus, as noted above, the responder device may include a responder table that includes a pre-computed initial access filter value for the requester device, which the responder device may generate from the user name for the requester device, the master key for the requester device, and the pre-shared secrets previously exchanged with the responder device. As such, in an operation 320, the responder device may compare the initial access filter value included in the SYN packet received from the requester device to the pre-computed initial access filter value stored for the requester device in the responder table. In response to operation 320 resulting in a determination that the initial access filter value in the SYN packet does not match the pre-computed initial access filter value for the requester device in the responder table, the responder device may drop the packet in an operation 330 without performing any further computation, storing any state information, or otherwise committing any further resources to processing the packet. On the other hand, in response to operation 320 resulting in a determination that the initial access filter value in the SYN packet matches the pre-computed initial access filter value stored in the responder table for the requester device, the responder device may authenticate the requester device and further process the SYN packet such that the requester device can mutually authenticate the responder device.

In particular, the SYN packet received at the responder device in operation 310 may include one or more secrets generated at the requester device in addition to the initial access filter value generated at the requester device, wherein the one or more secrets included in the SYN packet may provide pre-shared secrets that the requester device can use to mutually authenticate the responder device. For example, in one implementation, the one or more secrets included in the SYN packet may include an encrypted nonce and an encrypted time stamp generated at the requester device. As such, in response to authenticating the requester device in operation 320, the responder device may analyze the encrypted secrets included in the SYN packet in an operation 340 in order to decrypt the nonce and the time stamp that the requester device uses to mutually authenticate the responder device. Then, in an operation 350, the responder device may provide the decrypted nonce and the decrypted time stamp to the keyed hash function to generate an access filter value for the responder device from the decrypted secrets. Additionally, in an operation 360, the responder device may generate updated secrets that will be exchanged with the requester device (e.g., an updated time stamp and/or an updated nonce), and may further generate an update to the access filter value stored in the responder table for the requester device.

Accordingly, in one implementation, the responder device may encrypt the updated secrets generated in operation 360, wherein the responder device may insert the access filter value calculated from the decrypted secrets in operation 350, the encrypted updated secrets generated in operation 360, and a checksum within an ACK packet. The responder device may then send the ACK packet that includes the access filter value for the responder device, the encrypted updated secrets, and the checksum to the requester device in an operation 370. As such, the techniques described herein may update the access filter value with a different time stamp and a different nonce for each message frame communicated between the requester device and the responder device, which may increase randomness for the access filter values in subsequent message frames communicated between the requester device and the responder device. Furthermore, once the responder device sends the ACK packet to the requester device in operation 370, the responder device has completed the first half of the two-way handshake in the SMAS (i.e., authenticating that the SYN packet received in operation 310 was from a legitimate user of the requester device). Additionally, in one implementation, the method illustrated in FIG. 3 may further include an operation 380, in which the responder device may store the initial access filter value for the requester device (and vice versa). In particular, the initial access filter value for the requester device may be stored at the responder device (and vice versa), wherein the initial access filter values may be used in the SPUDP recovery mode that will be described in further detail below with respect to FIG. 6.

As such, in one implementation, the requester device may then process the ACK packet received from the responder device in accordance with similar techniques as illustrated in FIG. 3 and described herein (e.g., the dashed line in. FIG. 3 that connects operation 370 with operation 310 may represent a transfer in processing to the requester device, wherein the requester device receives the ACK packet in operation 310 and initiates the subsequent operations in a similar manner as described herein to perform the second half of the two-way handshake in the SMAS that authenticates the responder device). Thus, updating the pre-shared secrets exchanged between the requester device and the responder device and updating the access filter value included in message frames communicated between the requester device and the responder device may be considered a synchronized process for both the requester device and the responder device. In particular, every time that a receiving device (or responder device) receives a legitimate packet from a sending device (or requester device), the access filter value for the sending device may be changed at the receiving device, and the access filter value that the sending device includes in the next packet communicated to the receiving device may be updated based on the updated secrets that the receiving device exchanges with the sending device.

According to one aspect of the invention, in response to completing the Session Mutual Authentication Stage that identifies the requester device and the responder device to one another (e.g., as illustrated in FIG. 3 and described above), the requester device and the responder device may perform the Dynamic Data Communication Stage (DDCS) of the Secure Frame Layer (SFL) transport and security protocol. For example, in one implementation, the Dynamic Data Communication Stage may be performed according to the method illustrated in FIG. 4, wherein the DDCS may handle ordered data transfer between the requester device and the responder device. In addition, the DDCS may initiate one or more modes of the SPUDP transport and security protocol, which can handle retransmission of lost packets communicated between the requester device and the responder device, update location information for the requester device to restore connectivity between the requester device and the responder device, and recover the requester device in response to losing the connectivity between the requester device and the responder device, among other things.

In one implementation, the Dynamic Data Communication Stage of the Secure Frame Layer transport and security protocol may begin in an operation 410, wherein the responder device receives a SYN packet that contains an encrypted message from the requester device. The responder device may then decrypt the message contained in the packet received from the requester device and check the decrypted message for one or more conditions. For example, in one implementation, the responder device may check whether the decrypted message includes a logoff indication from the requester device in an operation 415. In particular, to terminate a communications session with the responder device, the requester device may send a "BYE" message to the responder device within the packet received in operation 410. In response to determining that the decrypted message includes the logoff indication from the requester device in an operation 415 (i.e., the decrypted message includes the "BYE" message), an operation 420 may include the responder device initiating the SPUDP recovery mode that will be described in further detail below with respect to FIG. 6.

On the other hand, in response to determining that the decrypted message does not include the logoff indication from the requester device in an operation 415, the requester device may check whether the decrypted message includes a request to update a location of the requester device in an operation 425. In particular, to request the update to the location of the requester device, the requester device may formulate an update message that includes an updated IP address, an updated port number, or other updated location information for the requester device. Thus, in response to determining that the decrypted message includes the update message that updates the location of the requester device in operation 425, an operation 430 may include the responder device initiating the SPUDP update mode that will be described in further detail below with respect to FIG. 8.

Moreover, in one implementation, in addition to the update message, the packet received from the requester device in operation 410 may further include an access filter value for the requester device, updated encrypted secrets generated at the responder device that the responder device uses to authenticate a subsequent message frame received from the requester device, and a checksum. As such, in one implementation, the requester device may send a message frame to the responder device that includes both an update message, information that the responder device can use to authenticate the requester device, and information that the requester device can use to authenticate the responder device.

For example, as noted above, the responder device may include a responder table that includes a pre-computed access filter value for the requester device, which the responder device may generate from the user name for the requester device, the master key for the requester device, and the pre-shared secrets previously exchanged with the responder device. As such, in an operation 445, the responder device may compare the access filter value included in the SYN packet received from the requester device to the pre-computed access filter value stored for the requester device in the responder table. In response to operation 445 resulting in a determination that the access filter value in the SYN packet does not match the pre-computed access filter value for the requester device in the responder table, the responder device may drop the packet in an operation 450 without performing any further computation, storing any state information, or otherwise committing any further resources to processing the packet. On the other hand, in response to operation 445 resulting in a determination that the initial access filter value in the SYN packet matches the pre-computed access filter value stored in the responder table for the requester device, the responder device may authenticate the requester device and further process the SYN packet such that the requester device can authenticate a subsequent message frame from the responder device.

In particular, the SYN packet received at the responder device in operation 410 may include one or more secrets generated at the requester device in addition to the access filter value generated at the requester device, wherein the one or more secrets included in the SYN packet may provide pre-shared secrets that the requester device can use to authenticate the a subsequent message frame from the responder device. For example, in one implementation, the one or more secrets included in the SYN packet may include an encrypted nonce and an encrypted time stamp generated at the requester device. As such, in response to authenticating the requester device in operation 445, the responder device may analyze the encrypted secrets included in the SYN packet in an operation 460 in order to decrypt the nonce and the time stamp that the requester device uses to authenticate the subsequent message frame from the responder device. Then, in an operation 470, the responder device may provide the decrypted nonce and the decrypted time stamp to the keyed hash function to generate an access filter value for the responder device from the decrypted secrets. Additionally, in an operation 480, the responder device may generate updated secrets that will be exchanged with the requester device in the subsequent message frame (e.g., an updated time stamp and/or an updated nonce), and may further generate an update to the access filter value stored in the responder table for the requester device.

Accordingly, in one implementation, the responder device may encrypt the updated secrets generated in operation 480, wherein the responder device may insert the access filter value calculated from the decrypted secrets in operation 470, the encrypted updated secrets generated in operation 480, and a checksum within an ACK packet. The responder device may then send the ACK packet that includes the access filter value for the responder device, the encrypted updated secrets, and the checksum to the requester device in an operation 490. As such, the techniques described herein may update the access filter value with a different time stamp and a different nonce for each message frame communicated between the requester device and the responder device, which may increase randomness for the access filter values in subsequent message frames communicated between the requester device and the responder device. Thus, after the responder device has sent the ACK packet to the requester device in operation 490, the responder device has completed the first half of the DDCS (i.e., authenticating that the SYN packet received from the requester device in operation 410 was from a legitimate user of the requester device).

Furthermore, in one implementation, the requester device may then process the ACK packet received from the responder device in accordance with similar techniques as illustrated in FIG. 4 and described herein (e.g., the requester device may receive the ACK packet from the responder device and determine whether or not to authenticate the responder device in a similar manner as described above in connection with operations 445 through 490). Thus, updating the pre-shared secrets exchanged between the requester device and the responder device and updating the access filter value included in message frames communicated between the requester device and the responder device may be considered a synchronized process for both the requester device and the responder device. In particular, every time, that a receiving device (or responder device) receives a legitimate packet from a sending device (or requester device), the access filter value for the sending device may be changed at the receiving device, and the access filter value that the sending device includes in the next packet communicated to the receiving device may be updated based on the updated secrets that the receiving device exchanges with the sending device.

Figure 5:
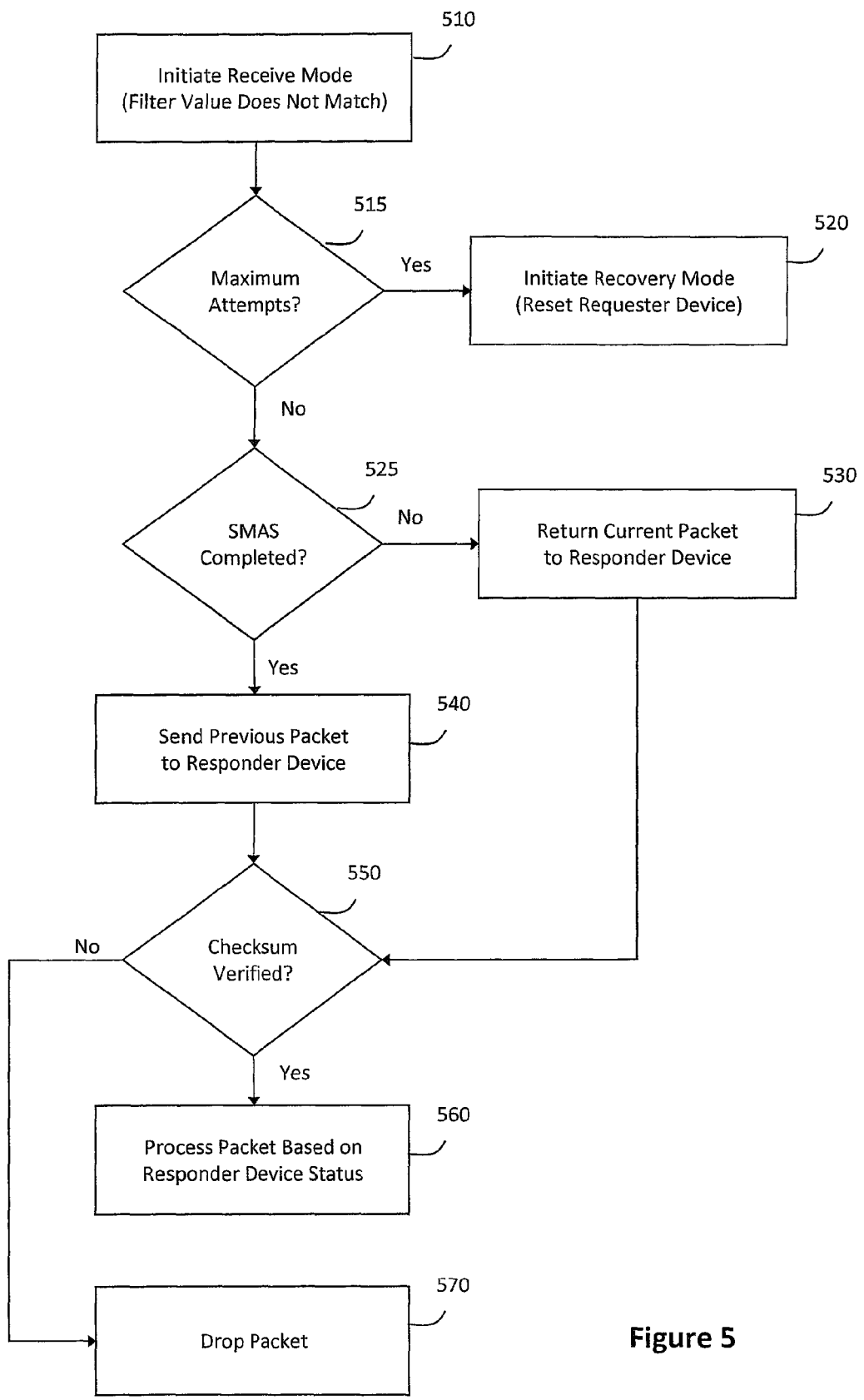
FIGS. 5-8 illustrate flow diagrams of exemplary methods for providing a Secure Persistent User Datagram Protocol at the requester device and the responder device depicted in FIG. 1, according to one aspect of the invention.

According to one aspect of the invention, FIG. 5 illustrates an exemplary method for operating the receive mode of the Secure Persistent User Datagram Protocol (SPUDP) on to prevent denial of service attacks. In particular, as noted above, whenever the responder device receives a packet from a requester device, the responder device may check whether an access filter value that the requester device generated and inserted within the packet matches a pre-computed access filter value stored for the requester device in a responder table maintained at the responder device. In response to determining that the access filter value inserted within the packet received from the requester device matches the pre-computed access filter value stored in the responder table and associated with an identifier for the requester device, the responder device may authenticate the requester device and further process the SYN packet such that the requester device can authenticate a subsequent message frame from the responder device. Otherwise, in response to determining that the access filter value in the packet does not match the pre-computed access filter value stored in the responder table for the requester device, the receive mode of the SPUDP transport and security protocol may be initiated in an operation 510.

For example, in one implementation, the responder device may check whether the requester device has exceeded a maximum number of allowable attempts to communicate a valid access filter value (e.g., three attempts). In response to determining that the requester device has exceeded the maximum number of allowable attempts, the responder device may initiate the SPUDP recovery mode in an operation 520. In particular, as will be described in further detail below with reference to FIG. 6, the responder device may initiate the SPUDP recovery mode in operation 520 to reset the requester device. However, in response to determining that the requester device has not exceeded the maximum number of allowable attempts, an operation 525 may include the responder device determining whether the requester device has completed the SMAS two-way handshake described above in connection with FIG. 3.

In one implementation, if the requester device has not previously completed the SMAS two-way handshake, the responder device may return the current packet to the responder device in an operation 530, whereas if the requester device has previously completed the SMAS two-way handshake, an operation 540 may include the responder device sending the requester device a previous packet that the responder device received from the responder device. As such, in the latter case, the responder device may have received the previous packet from another requester device (e.g., an illegitimate requester device), whereby returning the previous packet to the requester device may notify the requester device of an authentication issue, that one or more packets have been lost, or that another problem requiring attention has occurred. Furthermore, in an operation 550, the responder device may decrypt the checksum included in the packet received from the responder device and verify whether the decrypted checksum is valid. In response to operation 550 resulting in a determination that the checksum verification failed, an operation 570 may include dropping the packet at the responder device.

Otherwise, in response to operation 550 resulting in a determination that the checksum verification passed, an operation 560 may include the responder device further processing the packet based on the SMAS status of the responder device. In particular, in response to the responder device determining that the requester device has neither exceeded the maximum number of allowable attempts nor completed the SMAS two-way handshake, operation 560 may include the responder device decrypting any secrets contained in the packet, calculating an access filter value from the decrypted secrets, and exchanging updated secrets with the requester device (i.e., initiating processes to complete the first half of the SMAS two-way handshake). In contrast, in response to determining that the requester device has not exceeded the maximum number of allowable attempts, but that the requester device has completed the SMAS two-way handshake, the responder device may know that the requester device is operating in the SPUDP retransmission mode that will be described in greater detail below with reference to FIG. 7. As such, in the latter case, operation 560 may include the responder device further processing the packet in accordance with the DDCS techniques described above with reference to FIG. 4.

Furthermore, referring back to operations 530 and 540, the requester device may receive either the current packet or the previous packet from the responder device and further process the packet as appropriate. For example, the requester device may simply reject the packet received from the responder device in response to determining that the requester device has already entered the SPUDP recovery mode, or alternatively in response to the access filter value in the packet received from the responder device not matching another access filter value that the requester device previously communicated to the responder device (i.e., the access filter value will match another access filter value that the requester device previously communicated to the responder device unless a different device generated the access filter value, in which case the packet may be deemed illegitimate). On the other hand, if the access filter value in the packet received from the responder device matches a previous access filter value that the requester device communicated to the responder device, the requester device may determine whether a last buffer contains a null value.

In particular, if the last buffer does not contain a null value, the requester device may know that a previous packet sent to the responder device was lost (e.g., the transport and security protocols based on UDP may account for lost packets because UDP does not provide reliability and ordering guarantees of other protocols such as TCP). Thus, because the previous packet sent to the responder device would have been lost, the packet sent from the requester device in operation 530 or 540 will match a previous access filter value, which may notify the requester device of the appropriate packet to resend to the responder device. Thus, if the incoming access filter value matches a previous access filter value, the requester device may perform the SPUDP retransmission mode to resend the packet to the responder device and wait for an appropriate ACK packet from the responder device. Furthermore, the encrypted secrets and data payload may also be attached within the retransmitted packet to ensure that the responder device receives the appropriate information to generate the access filter value that will be exchanged with the requester device in the ACK packet, as described above.

Figure 6:
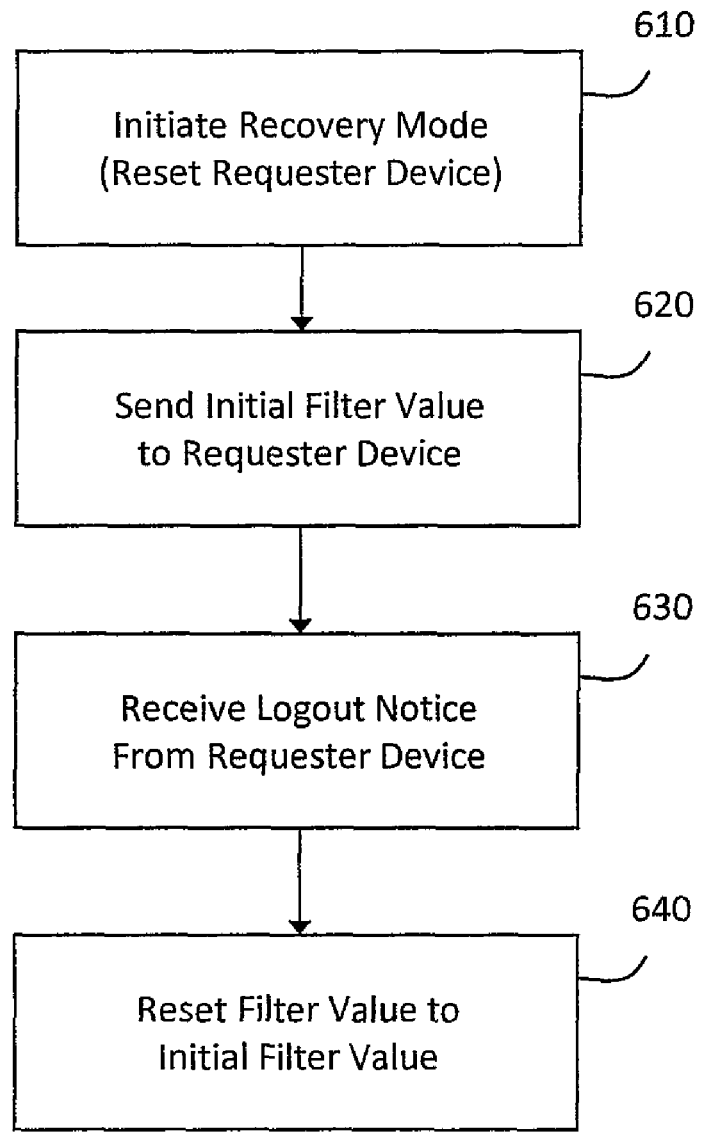

According to one aspect of the invention, FIG. 6 illustrates an exemplary method for operating the recovery mode of the Secure Persistent User Datagram Protocol to prevent denial of service attacks. In particular, as noted above, the SPUDP recovery mode may be initiated, as appropriate, in response td various circumstances indicating that the requester device may need to be reset (e.g., exceeding a maximum number of allowable attempts to send a packet that contains a valid access filter value). Thus, as further noted above, the initial access filter value created during the Initial Configuration Stage may be stored at the responder device, wherein the initial access filter value may be used to reestablish or otherwise recover a potentially disrupted session between the requester device and the responder device. Furthermore, as will be described in greater detail herein, in response to reestablishing or otherwise recovering the session between the requester device and the responder device, the initial access filter value may be dynamically updated for subsequent message frames communicated between the requester device and the responder device until the session has been properly closed (e.g., with the requester device sending a logoff indication, such as a "BYE" message, to the responder device).

As noted above, the SPUDP recovery mode may be initiated in an operation 610 in response to various appropriate circumstances indicating that the requester device may need to be reset. For example, the SPUDP recovery mode may be initiated in response to the requester device exceeding the maximum number of allowable attempts to send a packet that contains a valid access filter value, the responder device receiving a message from the requester device that include a logoff notice, or various other circumstances, as appropriate. For example, in one implementation, once the SPUDP recovery mode has been initiated, the SPUDP recovery mode may generally begin with an operation 620, wherein the responder device may send the initial access filter value created during the Initial Configuration Stage to the requester device, wherein sending the initial access filter value to the requester device may notify the requester device to enter the SPUDP recovery mode.

In one implementation, the responder device may then wait until a logout notice has been received from the requester device in an operation 630, and in response to receiving the logout notice from the requester device, an operation 640 may then include the responder device resetting the access filter value stored for the requester device in the responder table to the initial access filter value. Accordingly, the SPUDP recovery mode may generally reset the access filter value that the responder device uses to authenticate the requester device to a previous access filter value that resulted in an authenticated session between the requester device and the responder device, such that dynamically updating access filter values can be resumed for subsequent message frames communicated between the requester device and the responder device in a similar manner as described above.

For example, if a connection between the requester device and the responder device has been disrupted, either temporarily or otherwise, the responder device could potentially send one, or more packets to the requester device during the disconnected state. As such, in response to the requester device determining that the disrupted connection has been restored, the requester device may contact the responder device to determine whether the responder device sent any packets to the requester device during the disconnected state. In response to determining that the responder device sent a packet to the requester device during the disconnected state, which would be missing or otherwise lost due to the disconnected state, the responder device may return the missing or otherwise lost packet to the requester device with the access filter value previously created for that packet. However, when the requester device communicates a packet to contact the responder device and determine whether any packets were lost during the disconnected state, the responder device will have previously updated the access filter value stored for the requester device in the responder table (i.e., the responder device automatically updated the access filter value when the missing or otherwise lost packet was originally sent to the requester device).

As such, the updated secrets communicated to the requester device in the missing or otherwise lost packet will not have reached the requester device due to the disconnected state, meaning that the requester device will not have the updated secrets needed to generate the correct access filter value that the responder device uses to authenticate the requester device. In other words, when the requester device communicates the packet to contact the responder device and determine whether any packets were lost during the disconnected state, the responder device will reject that packet because the access filter value in that packet will not match the updated access filter value in the responder table, which the responder device previously generated from the updated secrets that did not reach the requester device due to the disconnected state (i.e., the requester device would not be able to generate the correct updated access filter value without knowing the updated secrets).

Similarly, when the requester device receives the packet containing the initial access filter value from the responder device, which may be sent to the requester device in operation 620 as described above, the initial access filter value in the packet received from the responder device will not match the current access filter value stored for the responder device in the requester table. In particular, the responder device will not have received any packets from the requester device that would result in the responder device generating the updated access filter value stored at the requester device from the updated secrets generated at the requester device. Thus, in response to receiving the packet containing the initial access filter value that the responder device sends in operation 620, the requester device may determine that the initial access filter value in that packet does not match the current updated access filter value stored for the responder device.

Therefore, in one implementation, in response to determining that the initial access filter value in the packet received from the responder device does not match the current access filter value stored at the requester device, the requester device may compare the initial access filter value contained in the current packet received from the responder device to the initial access filter value created during the Initial Configuration Stage. Assuming that the requester device is legitimate and therefore has the correct initial access filter value, the initial access filter value contained in the current packet received from the responder device should match the initial access filter value that the requester device stored during the Initial Configuration Stage, which may trigger the SPUDP recovery mode at the requester device.

For example, in one implementation, triggering the SPUDP recovery mode at the requester device may set a flag instructing the requester device to enter the SPUDP receive mode, wherein the requester device may decrypt the secrets contained in the current packet and recover any messages further contained therein. The requester device may then exit and restart the authentication application, which may locally reset the requester device and trigger the logout notice that the responder device waits to receive in operation 630. The responder device may then reset the current access filter value stored for the requester device to the initial access filter value created during the Initial Configuration Stage in operation 640. Accordingly, the SPUDP recovery mode may then terminate, whereby generating dynamically updated access filter values from updated secrets may be resumed for subsequent message frames communicated between the requester device and the responder device.

Figure 7:
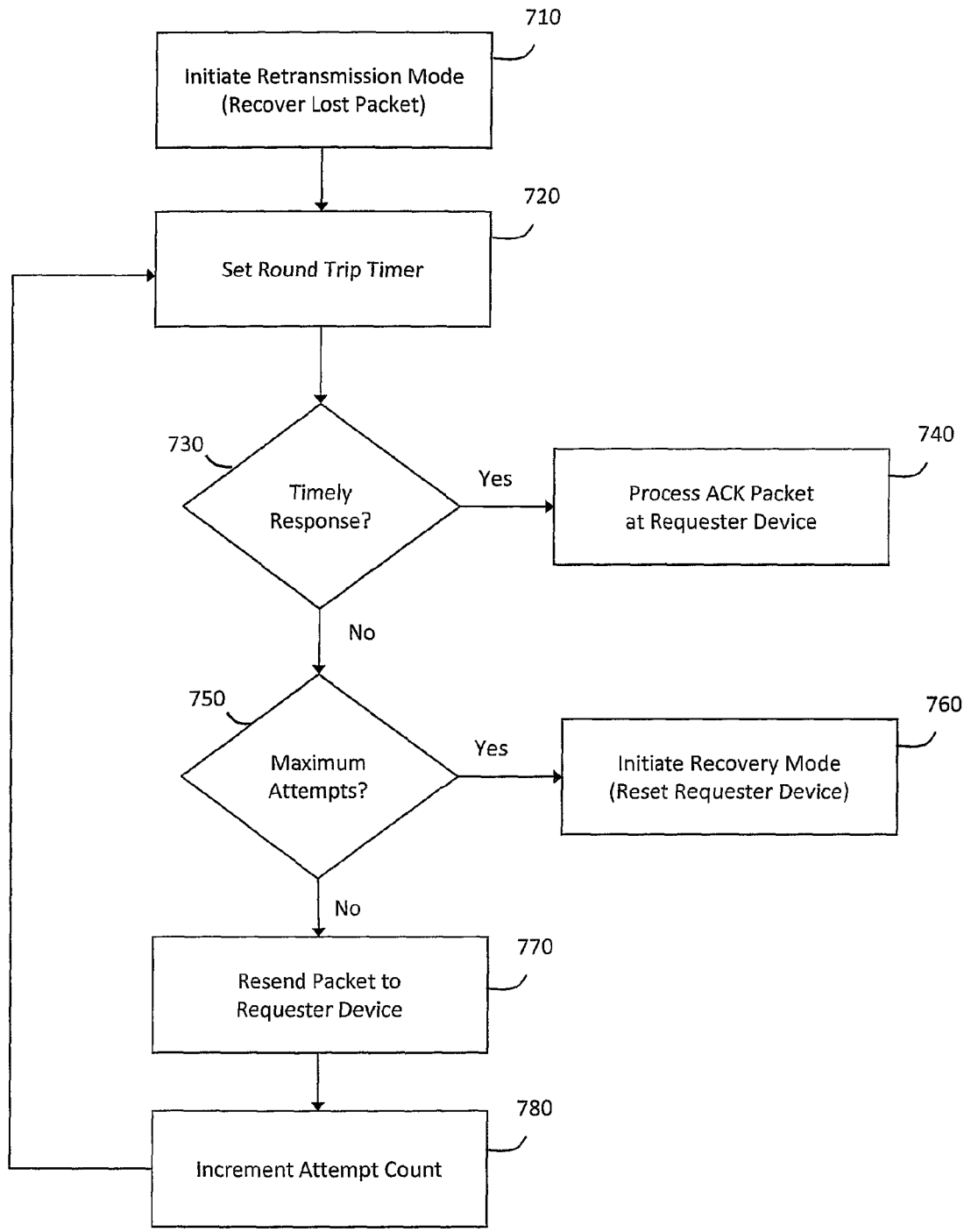

According to one aspect of the invention, FIG. 7 illustrates an exemplary method for operating the retransmission mode of the Secure Persistent User Datagram Protocol to prevent denial of service attacks. In particular, whenever the requester device sends a packet to the responder device or the responder device sends a packet to the requester device, the relevant device that sends the packet may initiate the SPUDP retransmission mode in an operation 710. As such, the relevant device that sends the packet may initiate the SPUDP retransmission mode in operation 710 to recover the packet in response to the packet being lost or otherwise failing to reach an intended destination of the packet. For ease of reference in the description provided herein relating to the manner in which the SPUDP retransmission mode operates, the relevant device that sends the packet will be referred to as the requester device and the intended destination of the packet will be referred to as the responder device.

In one implementation, the SPUDP retransmission mode may include an operation 720 in which the requester device may set a default round trip timer for the packet sent to the responder device (e.g., five seconds). For example, as noted above, the packet sent to the responder device may be transmitted within a message frame that includes an access filter value that the responder device uses to authenticate the packet received from the requester device. Furthermore, in response to authenticating the packet received from the requester device, the responder device may then send a packet to the requester device that includes an access filter value that the requester device uses to authenticate the responder device. In one implementation, the round trip timer established in operation 720 may define a time period to complete a round trip communication that begins with the requester device sending the packet to the responder device and ends with the responder device receiving the responsive packet from the requester device. Thus, in response to sending the packet to the responder device, the round trip timer set in operation 720 may start, and an operation 730 may then include the requester device determining whether a legitimate responsive packet has been received from the responder device prior to the round trip timer expiring.

In one implementation, in response to the requester device receiving the legitimate responsive packet from the responder device prior to the round trip timer expiring, operation 730 may include the requester device determining that a timely response was received. As such, the requester device may simply process the responsive ACK packet received from the responder device in an operation 740 and the SPUDP retransmission mode may then terminate. However, as noted above, UDP generally does not provide reliability and ordering guarantees provided by protocols such as TCP, which may result in packets being lost, arriving out of order, or otherwise dropped. As such, in response to the requester device not receiving the legitimate responsive packet from the responder device prior to the round trip timer expiring, operation 730 may include the requester device determining that a timely response was not received, wherein the requester device may assume that the packet sent to the responder device was dropped, lost, or otherwise failed to reach the requester device.

In one implementation, in response to determining that the requester device did not receive the timely response in operation 730, the requester device may attempt to retransmit the packet to the responder device until a maximum number of attempts have been made to send the packet to the responder device (e.g., three attempts). Thus, in response to the requester device determining that the timely response was not received, an operation 750 may include determining whether the maximum number of attempts to send the packet to the responder device has been reached, wherein an operation 770 may include resending the packet to the responder device if the maximum number of attempts has not been reached. In addition, the packet resent to the responder device in operation 770 may further include a retry flag (e.g., "RTY") that identifies the resent packet as a retransmission. For example, without including the retry flag in the retransmission packet, the responder device may compare the access filter value in the retransmission packet to an updated access filter value. As such, including the retry flag in the retransmission packet may notify the responder device to compare the access filter value in the retransmission packet to the previous access filter value, which may prevent packet loss for the responsive packet sent from the responder device to the requester device.

In one implementation, in response to sending the retransmission packet to the responder device in operation 770, the attempt count for the packet may then be incremented in an operation 780. Thus, the requester device may continue to attempt to retransmit the packet that was lost or otherwise failed to the responder device according to the techniques described above in connection with operations 720 through 780. If operation 730 continues to result in the retransmission packets failing to receive the timely response prior to expiration of the round trip time period until operation 750 results in a determination that the maximum number of retransmission attempts has been reached, the SPUDP recovery mode may then be initiated in an operation 760 (i.e., to reset the requester device, as described above in connection with FIG. 6).

Figure 8:
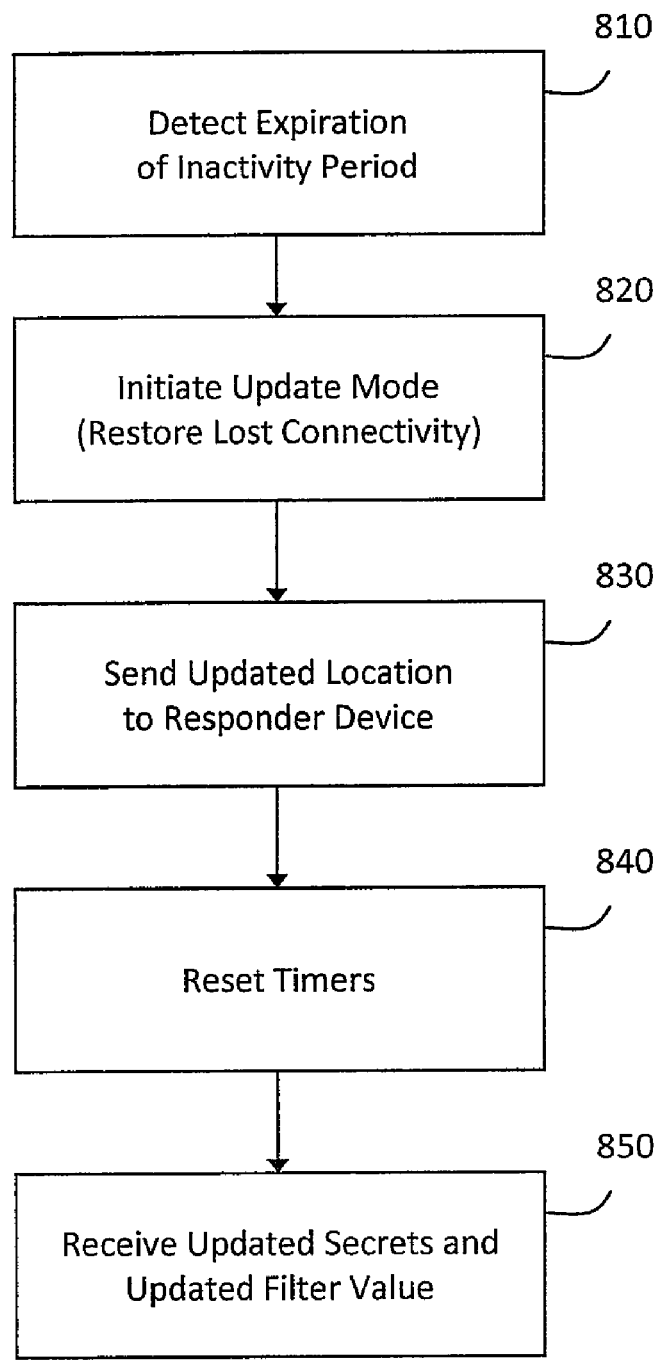

According to one aspect of the invention, FIG. 8 illustrates an exemplary method for operating the update mode of the Secure Persistent User Datagram Protocol to prevent denial of service attacks. In particular, the SPUDP update mode may generally be used to maintain connectivity between the requester device and the responder device. In one implementation, the SPUDP update mode may include an operation 810, wherein the requester device may detect that a predetermined inactivity period has expired and then initiate the SPUDP update mode in an operation 820. For example, the requester device may detect the expiration of the inactivity period in response to determining that there has not been any activity in which the requester device has received a packet, message frame, or other data from the responder device within the predetermined inactivity period.

In one implementation, the lack of receive activity at the requester device may reflect a disruption or loss in connectivity for a session between the requester device and the responder device due to the responder device having outdated location information for the requester device. For example, an IP address or a port number for the requester device may change from time to time, especially when the requester device connects to the responder device over public networks, whereby the lack of receive activity from the responder device may result because the responder device has been attempting to send packets, message frames, or other date to a previous IP address or a port number for the requester device that has changed. Thus, the SPUDP update mode may include an operation 830 in which the requester device sends an update request to the responder device, wherein the update request may include an updated IP address, an updated port number, or other updated location information for the requester device. Furthermore, an operation 840 may include resetting any timers associated with any of the Secure Frame Layer stages or SPUDP modes described above.

In one implementation, the SPUDP may be completed in an operation 850, wherein the requester device may receive updated secrets and an updated access filter value from the responder device. The requester device may then authenticate the responder device based on the updated access filter value received in operation 850. Moreover, the requester device may generate an updated access filter value from the updated secrets received in operation 850, such that the responder device can use the updated access filter value generated at the requester device from the updated secrets to authenticate a subsequent message frame from the requester device. As such, dynamically updating the access filter values can then be resumed for subsequent message frames communicated between the requester device and the responder device in a similar manner as described in further detail above.

Implementations of the invention may be made in hardware, firmware, software, or various combinations thereof. The invention may also be implemented as instructions stored on a machine readable medium, which may be read and executed using one or more processing devices. In one implementation, the machine readable medium may include various mechanisms for storing and/or transmitting information in a form that can be read by a machine (e.g., a computing device). For example, a machine readable storage medium may include read only memory, random access memory, magnetic disk storage media, optical storage media, flash memory devices, and other media for storing information, and a machine readable transmission media may include forms of propagated signals, including carrier waves, infrared signals, digital signals, and other media for transmitting information. While firmware, software, routines, or instructions may be described in the above disclosure in terms of specific exemplary aspects and implementations performing certain actions, it will be apparent that such descriptions are merely for the sake of convenience and that such actions in fact result from computing devices, processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. A system for providing unified transport and security protocols, comprising:
    a memory configured to store a first access filter value uniquely calculated for one requester device using one or more predetermined hash functions seeded with one or more first secrets generated at a responder device; and
    responder logic configured to execute on the responder device and cause the responder device to:
        transmit the one or more first secrets to the requester device to enable the requester device to seed the one or more predetermined hash functions with the one or more first secrets to calculate a first hash value;
        receive a first message frame from the requester device through a network interface coupled to a network, wherein the first message frame includes the first hash value calculated at the requester device and one or more second secrets generated at the requester device;
        authenticate the requester device in response to the first hash value included in the first message frame matching the first access filter value stored in the memory;
        seed the one or more predetermined hash functions with the one or more second secrets generated at the requester device to calculate a second hash value; and
        transmit a second message frame that includes the second hash value to the requester device through the network interface, wherein the responder logic is configured such that the second message frame is configured to cause the requester device to authenticate the responder device in response to the second hash value included in the second message frame matching a second access filter value that the requester device calculated by seeding the one or more predetermined hash functions with the one or more second secrets,
    wherein the responder logic is further configured, responsive to the first message frame including an update request, to:
        cause the responder device to update a location of the requester device in response to the first message frame including an update request;
        update the one or more first secrets and seed the one or more predetermined hash functions with the one or more updated first secrets to update the first access filter value in response to the first message frame including the update request;
        transmit the one or more updated first secrets and the updated first access filter value to the updated location of the requester device;
        receive a subsequent message frame from the requester device; and
        resume mutual authentication between the responder device and the requester device via the first access filter value and the second access filter value in response to the subsequent message frame including the updated first access filter value.

2. The system of claim 1, wherein the responder logic is further configured to cause the responder device to discard the first message frame without saving a state of the first message frame in response to the first hash value included in the first message frame not matching the first access filter value.

3. The system of claim 2, wherein the responder logic is further configured to trigger a recovery mode in response to receiving a predetermined number of subsequent message frames received from the requester device including hash values that do not match the first access filter value.

4. The system of claim 1, wherein the updated location of the requester device comprises one or more of an updated IP address or an updated port number.

5. The system of claim 1, wherein the responder logic is further configured to cause the responder device to:
    update the one or more first secrets generated at the responder device in response to the first hash value included in the first message frame received from the requester device matching the first access filter value;
    seed the one or more predetermined hash functions with the one or more updated first secrets to update the first access filter value;
    transmit the one or more updated first secrets to the requester device, wherein the responder logic is configured such that the transmission including the one or more updated first secrets is configured to cause the requester device is further configured to seed the one or more predetermined hash functions with the one or more updated first secrets to update the first hash value;
    receive a third message frame from the requester device through the network interface, wherein the third message frame includes the updated first hash value calculated at the requester device;
    authenticate the requester device in response to the updated first hash value included in the third message frame matching the updated first access filter value; and
    discard the third message frame in response to the updated first hash value included in the third message frame not matching the updated first access filter value.

6. The system of claim 5, wherein the responder logic is further configured to cause the responder device to:
    replace the updated first access filter value in the memory with the initially calculated first access filter value in response to a predetermined number of subsequent message frames received from the requester device including hash values that do not match the updated first access filter value;
send the initially calculated first access filter value to the requester device;
receive a recovery mode message frame from the requester device; and
authenticate the requester device in response to the recovery mode message frame including the initially calculated first access filter value.

7. A system for providing unified transport and security protocols, comprising:
a memory configured to store a master key that a responder device uniquely generated for one requester device using one or more predetermined hash functions seeded with one or more secrets generated at the responder device and login information for a legitimate user of the requester device; and
requester logic configured to execute on the requester device and cause the requester device to:
receive, from the responder device, the master key generated at the responder device and the one or more secrets generated at the responder device;
initiate, at the requester device, a login session to enter a user name and password at the requester device;
receive the user name and password at the requester device during the login session;
seed the one or more predetermined hash functions with the one or more secrets received from the responder device and the user name and password received during the login session to calculate a local master key; and
establish a connection with the responder device in response to the local master key matching the master key stored in the memory.

8. The system of claim 7, wherein the requester logic is further configured to cause the requester device to initiate an active open with the responder device to establish the connection with the responder device.

9. The system of claim 8, wherein the requester logic is further configured to cause the requester device to initiate the active open with the responder device in response to determining that the responder device has initiated a passive open with the requester device.

10. The system of claim 7, wherein the one or more secrets generated at the responder device include a nonce and a timestamp.

11. A system for providing unified transport and security protocols, comprising:
a memory configured to store one or more secrets generated at a responder device and received from the responder device;
requester logic configured to execute on a requester device and cause the requester device to:
seed one or more predetermined hash functions with the one or more secrets generated at the responder device and stored in the memory to calculate a hash value;
transmit a message frame to the responder device through a network interface coupled to a network, wherein the message frame includes the hash value calculated at the requester device;
determine whether a responsive message has been received from the responder device to indicate that the hash value in the message frame transmitted to the responder device matches an access filter value that the responder device calculated using the one or more predetermined hash functions; and
retransmit the message frame to the responder device in response to determining that the responsive message has not been received from the responder device and that one or more predetermined conditions have been satisfied.

12. The system of claim 11, wherein the one or more predetermined conditions include the requester device not receiving the responsive message from the responder device prior to a round trip timer associated with the message frame expiring.

13. The system of claim 12, wherein the one or more predetermined conditions further include the requester device having retransmitted the message frame to the responder device less than a predetermined number of times.

14. The system of claim 13, wherein the requester logic is further configured to cause the requester device to enter one or more of a recovery mode or an update mode to restore a session with the responder device in response to the requester device not receiving the responsive message prior to the round trip timer expiring and having retransmitted the message frame the predetermined number of times.

15. A method for providing unified transport and security protocols, comprising:
storing, at a responder device, a first access filter value uniquely calculated for one requester device in a memory, wherein the responder device calculated the first access filter value using one or more predetermined hash functions seeded with one or more first secrets generated at the responder device;
transmitting, from the responder device, the one or more first secrets to the requester device to enable the requester device to seed the one or more predetermined hash functions with the one or more first secrets to calculate a first hash value;
receiving, at the responder device, a first message frame from the requester device through a network interface coupled to a network, wherein the first message frame includes the first hash value calculated at the requester device and one or more second secrets generated at the requester device;
authenticating the requester device in response to the responder device determining that the first hash value included in the first message frame matches the first access filter value stored in the memory;
seeding, at the responder device, the one or more predetermined hash functions with the one or more second secrets generated at the requester device to calculate a second hash value;
transmitting, from the responder device, a second message frame that includes the second hash value to the requester device such that the second message frame is configured to cause the requester device to authenticate the responder device in response to the second hash value included in the second message frame matching a second access filter value that the requester device calculated by seeding the one or more predetermined hash functions with the one or more second secrets;
updating, at the responder device, a location of the requester device in response to the first message frame including an update request;
updating the one or more first secrets at the responder device in response to the first message frame including the update request;
seeding the one or more predetermined hash functions with the one or more updated first secrets to update the first access filter value in response to the update request;

transmitting the one or more updated first secrets and the updated first access filter value from the responder device to the updated location of the requester device;

receiving, at the responder device, a subsequent message frame from the requester device; and resuming mutual authentication between the responder device and the requester device via the first access filter value and the second access filter value in response to the subsequent message frame including the updated first access filter value.

16. The method of claim 15, further comprising discarding the first message frame at the responder device without saving a state of the first message frame in response to the first hash value included in the first message frame not matching the first access filter value.

17. The method of claim 15, wherein the updated location of the requester device comprises one or more of an updated P address or an updated port number.

18. The method of claim 15, further comprising:

updating, at the responder device, the one or more first secrets generated at the responder device in response to the first hash value included in the first message frame received from the requester device matching the first access filter value;

seeding, at the responder device, the one or more predetermined hash functions with the one or more updated first secrets to update the first access filter value;

transmitting, from the responder device, the one or more updated first secrets to the requester device to enable the requester device to seed the one or more predetermined hash functions with the one or more updated first secrets to update the first hash value;

receiving, at the responder device, a third message frame from the requester device through the network interface, wherein the third message frame includes the updated first hash value calculated at the requester device;

authenticating the requester device in response to the responder device determining that the updated first hash value included in the third message frame matches the updated first access filter value; and discarding the third message frame at the responder device in response to the updated first hash value included in the third message frame not matching the updated first access filter value.

19. The method of claim 16, further comprising triggering, from the responder device, a recovery mode in response to determining that the responder device has received a predetermined number of subsequent message frames from the requester device that include hash values that do not match the first access filter value.

20. The method of claim 18, further comprising:

replacing the updated first access filter value stored in the memory at the responder device with the initially calculated first access filter value in response to a predetermined number of subsequent message frames received from the requester device including hash values that do not match the updated first access filter value;

sending the initially calculated first access filter value from the responder device to the requester device;

receiving, at the responder device, a recovery mode message frame from the requester device; and authenticating the requester device in response to the responder device determining that the recovery mode message frame received from the requester device includes the initially calculated first access filter value.

21. A method for providing unified transport and security protocols, comprising:

storing, in a memory at a requester device, a master key that a responder device uniquely calculated for one requester device using one or more predetermined hash functions seeded with one or more secrets generated at the responder device and login information for a legitimate user of the requester device;

receiving, at the requester device, the master key generated at the responder device and the one or more secrets generated at the responder device, wherein the requester device receives the master key and the one or more secrets from the responder device;

initiating, at the requester device, a login session to enter a user name and password at the requester device;

receiving, at the requester device, the user name and password during the login session;

seeding, at the requester device, the one or more predetermined hash functions with the one or more secrets received from the responder device and the user name and password received during the login session to calculate a local master key; and establishing, from the requester device, a connection with the responder device in response to the local master key matching the master key stored in the memory.

22. The method of claim 21, wherein establishing the connection with the responder device includes initiating, from the requester device, an active open with the responder device.

23. The method of claim 22, wherein the requester device initiates the active open with the responder device in response to determining that the responder device has initiated a passive open with the requester device.

24. The method of claim 21, wherein the one or more secrets generated at the responder device include a nonce and a timestamp.

25. A method for providing unified transport and security protocols, comprising:

storing, at a requester device, one or more secrets generated at a responder device and received from the responder device;

seeding, at the requester device, one or more predetermined hash functions with the one or more secrets generated at the responder device and stored in the memory to calculate a hash value;

transmitting, from the requester device, a message frame to the responder device through a network interface coupled to a network, wherein the message frame includes the hash value calculated at the requester device;

determining, at the requester device, whether a responsive message has been received from the responder device to indicate that the hash value in the message frame transmitted to the responder device matches an access filter value that the responder device calculated using the one or more predetermined hash functions; and retransmitting, from the requester device, the message frame to the responder device in response to determining that the responsive message has not been received from the responder device and that one or more predetermined conditions have been satisfied.

26. The method of claim 25, wherein the one or more predetermined conditions include the requester device not receiving the responsive message from the responder device prior to a round trip timer associated with the message frame expiring.

27. The method of claim 26, wherein the one or more predetermined conditions further include the requester device having retransmitted the message frame to the responder device less than a predetermined number of times.

28. The method of claim 27, further comprising entering one or more of a recovery mode or an update mode at the requester device to restore a session with the responder device in response to determining that the requester device has not received the responsive message prior to the round trip timer expiring and has retransmitted the message frame the predetermined number of times.

* * * * *